United States Patent
Seo et al.

(10) Patent No.: US 9,042,925 B2
(45) Date of Patent: May 26, 2015

(54) METHOD AND APPARATUS FOR REDUCING INTER-CELL INTERFERENCE IN A WIRELESS COMMUNICATION SYSTEM

(75) Inventors: Han Byul Seo, Anyang-si (KR); Hak Seong Kim, Anyang-si (KR); Byoung Hoon Kim, Anyang-si (KR); Ki Jun Kim, Anyang-si (KR); Eun Sun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 13/497,090

(22) PCT Filed: Dec. 2, 2010

(86) PCT No.: PCT/KR2010/008581
§ 371 (c)(1),
(2), (4) Date: Mar. 20, 2012

(87) PCT Pub. No.: WO2011/068367
PCT Pub. Date: Jun. 9, 2011

(65) Prior Publication Data
US 2012/0178482 A1 Jul. 12, 2012

Related U.S. Application Data

(60) Provisional application No. 61/266,158, filed on Dec. 3, 2009, provisional application No. 61/266,159, filed on Dec. 3, 2009, provisional application No. 61/317,703, filed on Mar. 26, 2010.

(51) Int. Cl.
*H04B 15/00* (2006.01)
*H04W 56/00* (2009.01)
*H04W 72/12* (2009.01)
*H04W 88/08* (2009.01)

(52) U.S. Cl.
CPC .......... *H04W 56/00* (2013.01); *H04W 72/1278* (2013.01); *H04W 88/08* (2013.01)

(58) Field of Classification Search
CPC .. H04W 56/00; H04W 72/1278; H04W 88/08
See application file for complete search history.

(56) References Cited

U.S. PATENT DOCUMENTS

2004/0202119 A1* 10/2004 Edge .............................. 370/324
2008/0080448 A1*  4/2008 Rottinghaus .................. 370/342
2008/0233966 A1   9/2008 Scheim et al.
(Continued)

FOREIGN PATENT DOCUMENTS

WO      WO 2011031195 A1 *  3/2011

*Primary Examiner* — Fayyaz Alam
*Assistant Examiner* — Mohammed Rachedine
(74) *Attorney, Agent, or Firm* — Birch, Stewart, Kolasch & Birch, LLP

(57) ABSTRACT

The present invention relates to a method including aligning a boundary of a downlink subframe from the first base station to a first user equipment with a boundary of a downlink subframe from a second base station to a second user equipment; acquiring timing advance information indicating a time by which a boundary of an uplink subframe from the first user equipment to the first base station advances compared to the aligned boundary of the downlink subframe; and notifying the first user equipment of a time point at which an uplink subframe is transmitted from the first user equipment to the first base station based on the acquired timing advance information, wherein the boundary of the uplink subframe from the notified first user equipment to the first base station is aligned with a boundary of an uplink subframe from the second user equipment to the second base station.

10 Claims, 23 Drawing Sheets

(56) References Cited

U.S. PATENT DOCUMENTS

2008/0267127 A1* 10/2008 Narasimha et al. ........... 370/331
2009/0137241 A1 5/2009 Yavuz et al.
2009/0264077 A1 10/2009 Damnjanovic
2011/0075611 A1* 3/2011 Choi ............................. 370/329
2011/0223883 A1* 9/2011 Ishii et al. ..................... 455/408

* cited by examiner align uplink reception timings (a)

(b)

METHOD AND APPARATUS FOR REDUCING INTER-CELL INTERFERENCE IN A WIRELESS COMMUNICATION SYSTEM

CROSS REFERENCE TO RELATED APPLICATIONS

This application is the National Phase of PCT/KR2010/008581 filed on Dec. 2, 2010, which claims priority under 35 U.S.C. §119(e) to U.S. Provisional Application Nos. 61/266,158 filed on Dec. 3, 2009, 61/266,159 filed on Dec. 3, 2009, and 61/317,703 filed on Mar. 26, 2010, all of which are hereby expressly incorporated by reference into the present application.

TECHNICAL FIELD

The present invention relates to a wireless communication system, and more particularly, to a method and apparatus for reducing inter-cell interference in a wireless communication system.

BACKGROUND ART

FIG. 1 illustrates a heterogeneous network wireless communications system 100 including a macro eNB (MeNB) and a micro eNB. In the description of the present invention, the term "heterogeneous network" refers to a network in which a macro eNB 110 and a micro eNB 120 are present together even though the same Radio Access Technology (RAT) is used.

The macro eNB 110 is a general eNode B (base station) of a wireless communication system which has a broad coverage and high transmission power. The macro eNB 110 may also be referred to as a macro cell.

The micro eNB 120 may also be referred to as a micro cell, a pico cell, a femto cell, a home eNB (HeNB), or a relay. As a small-sized version of the macro eNB 110, the micro eNB 120 may independently perform most of the functions of the macro eNB. The micro eNB 120 may be installed (in an overlay manner) in an area covered by the macro eNB or may be installed (in a non-overlay manner) in a shadow area that cannot be covered by the macro eNB. The micro eNB 120 has a narrower coverage and lower transmission power and may accommodate a smaller number of user equipments (UEs), compared to the macro eNB 110.

A UE 131, which is hereinafter referred to as a macro UE (MUE), may be directly served by the macro eNB 110. A UE 132, which is hereinafter referred to as a micro UE or Home UE (HUE), may be served by the micro eNB 120. In some cases, the UE 132 present within the coverage of the micro eNB 120 may be served by the macro eNB 110.

The micro eNB may be classified into two types according to access limitations of the UE. The first type is a Closed Subscriber Group (CSG) micro eNB, and the second type is an Open Access (OA) or Open Subscriber Group (OSG) micro eNB. More specifically, the CSG micro eNB may serve only specific authorized UEs, and the OSG micro eNB may serve all types of UEs without any particular access limitations.

DISCLOSURE

Technical Problem

In the heterogeneous network described above, an uplink signal from a UE that is served by a macro eNB may cause strong interference to a micro eNB which is adjacent to (or neighbors) the UE. In addition, when a UE receives a downlink signal from a macro eNB, the downlink signal may cause strong interference to a micro eNB adjacent to the UE. When the macro UE receives a strong downlink signal from the micro eNB adjacent to the macro UE, the downlink signal may cause interference to a downlink signal that the macro UE 131 receives from the macro eNB.

In this case, if boundaries of subframes of the macro eNB and the micro eNB have been aligned, it is possible to avoid interference by adjusting frequency or time resources used for transmission of the UE such that the micro eNB is prevented from using the frequency or time resources. Alternatively, the micro eNB can avoid interference caused to the macro UE by adjusting downlink transmission power of the micro eNB. However, in the related art, a detailed method for aligning boundaries of subframes of a micro cell has not been provided and a detailed method for adjusting transmission power of a micro cell also has not been provided.

An object of the present invention is to provide a method and apparatus for reducing intercell interference in which boundaries of subframes of a micro cell are aligned and transmission power is adjusted to reduce intercell interference that occurs for various reasons in a heterogeneous network.

Objects of the present invention are not limited to those described above and other objects will be clearly understood by those skilled in the art from the following description.

Technical Solution

A method for reducing intercell interference in a wireless communication system in accordance with an embodiment of the present invention to achieve the objects of the present invention may include aligning, by a first base station, a boundary of a downlink subframe transmitted from the first base station to a first user equipment with a boundary of a downlink subframe received from a second base station to a second user equipment; acquiring, by the first base station, timing advance information indicating a time by which a boundary of an uplink subframe from the first user equipment to the first base station advances compared to the aligned boundary of the downlink subframe; and notifying, by the first base station, the first user equipment of a time point at which an uplink subframe is transmitted from the first user equipment to the first base station based on the acquired timing advance information, wherein the boundary of the uplink subframe transmitted from the notified first user equipment to the first base station is aligned with a boundary of an uplink subframe transmitted from the second user equipment to the second base station.

The aligning the boundary of the downlink subframe may include aligning, by the first base station, the boundary of the downlink subframe transmitted from the first base station to the first user equipment with a boundary of a downlink subframe acquired by receiving a downlink signal from the second base station.

Further, the aligning the boundary of the downlink subframe may include: receiving, by the first base station, time difference information between boundaries of downlink subframes from the first user equipment or the second user equipment; and adjusting a start time of the boundary of the downlink subframe from the first base station to the first user equipment based on the time difference information, wherein the time difference information between the boundaries of the downlink subframes is calculated as a time difference between the boundary of the downlink subframe from the first base station and the boundary of the downlink subframe from the second base station by the first user equipment or the second user equipment by receiving both a downlink signal from the first base station and a downlink signal from the second base station.

Furthermore, the receiving the time difference information of the boundaries of the downlink subframes from the second user equipment may be performed by a random access procedure from the second user equipment to the first base station.

In addition, the acquiring the timing advance information may be performed by: receiving, from the first user equipment, timing advance information acquired by the first user equipment by performing a random access procedure for the second base station, receiving, from the second user equipment or the second base station, timing advance information of uplink transmission from the second user equipment to the second base station, or detecting, at the first base station, an uplink signal from the second user equipment to the second base station and estimating timing advance information of uplink transmission from the second user equipment to the second base station.

Further, the receiving the timing advance information of uplink transmission from the second user equipment to the second base station from the second user equipment may be performed by a random access procedure from the second user equipment to the first base station.

Furthermore, the receiving, from the second base station, the timing advance information of uplink transmission from the second user equipment to the second base station may be performed through a control channel from the second base station to the first base station.

Moreover, the notifying the first user equipment may be performed through a common timing advance command for one or more user equipments served by the first base station.

In addition, aligning the boundary of the downlink subframe may be performed when the second user equipment is located adjacent to the first base station, and wherein the first base station aligns the boundary of the uplink subframe from the first user equipment to the first base station with the boundary of the downlink subframe from the first base station to the first user equipment when the second user equipment is hot located adjacent to the first base station.

Further, all or part of subframes to which uplink transmission from the first user equipment to the first base station is allocated may be set as cell-specific sounding reference signal transmission subframes.

Furthermore, a wireless link for signal transmission from the first base station to the second base station may not be present.

A base station for reducing intercell interference in a wireless communication system in accordance with another embodiment of the present invention to achieve the objects of the present invention may include a reception module for receiving an uplink signal from a first user equipment, a transmission module for transmitting a downlink signal to the first user equipment, and a processor for controlling the base station including the reception module and the transmission module, wherein the processor may be configured to: align a boundary of a downlink subframe transmitted from the base station to the first user equipment with a boundary of a downlink subframe received from a different base station than the base station to a second user equipment, acquire timing advance information indicating a time by which a boundary of an uplink subframe from the first user equipment to the base station advances compared to the aligned boundary of the downlink subframe, and notify the first user equipment of a time point at which an uplink subframe is transmitted from the first user equipment to the base station based on the acquired timing advance information, and wherein the boundary of the uplink subframe transmitted from the notified first user equipment to the base station is aligned with a boundary of an uplink subframe transmitted from the second user equipment to the different base station.

A method for supporting transmission power adjustment for reducing interference in a wireless communication system in accordance with another embodiment of the present invention to achieve the objects of the present invention may include measuring, at a second user equipment, power of downlink transmission from a first base station to a first user equipment or power of uplink transmission from the first user equipment to the first base station; reporting the measured transmission power to a second base station; receiving transmission power control information, indicating that the downlink transmission power or the uplink transmission power is to be reduced, from the second base station; and transmitting the received transmission power control information to the first base station, wherein the downlink transmission power or the uplink transmission power is reduced by the first base station based on the transmission power control information.

The transmitting the received transmission power control information to the first base station may be performed by a random access procedure from the second user equipment to the first base station.

In addition, the transmitting the received transmission power control information to the first base station may be performed through one or more physical random access channel (PRACH) preambles reserved for the transmission power control information or through a third message (Msg3) of the random access procedure.

Further, the transmission power control information may be a Power Control Command (PCC) or an Interference Overload Indication (IOI).

Furthermore, a wireless link for signal transmission may not be present between the first base station and the second base station.

A method for adjusting transmission power for reducing interference in a wireless communication system in accordance with another embodiment of the present invention to achieve the objects of the present invention may include receiving, by a first base station, transmission power control information, indicating that power of downlink transmission from the first base station to a first user equipment or power of uplink transmission from the first user equipment to the first base station is to be reduced, from a second user equipment; and reducing the downlink transmission power or the uplink transmission power based on the received transmission power control information, wherein the downlink transmission power or the uplink transmission power is measured by the second user equipment, wherein the measured transmission power is reported to the second base station, and wherein the transmission power control information is provided from the second base station to the second user equipment.

In addition, the receiving the transmission power control information from the second user equipment may be performed by a random access procedure from the second user equipment to the first base station.

Further, the receiving the transmission power control information from the second user equipment may be performed through one or more physical random access channel (PRACH) preambles reserved for the transmission power control information or through a third message (Msg3) of the random access procedure.

Furthermore, the transmission power control information may be a Power Control Command (PCC) or an Interference Overload Indication (IOI).

Moreover, a wireless link for signal transmission may not be present between the first base station and the second base station.

In addition, the reducing the uplink transmission power may be performed by transmitting a power control command to the first user equipment.

The method may further include activating a timer having a predetermined temporal length when receiving the transmission power control information from the second user equipment; and increasing the downlink transmission power or the uplink transmission power by a predetermined level when new transmission power control information is not received until the timer expires.

A user equipment for supporting transmission power control for reducing interference in a wireless communication system in accordance with another embodiment of the present invention to achieve the objects of the present invention may include a reception module for receiving a downlink signal from a first base station, a transmission module for transmitting an uplink signal to the first base station, and a processor for controlling the user equipment including the reception module and the transmission module, wherein the processor may be configured to measure power of downlink transmission from a second base station to a user equipment different from the user equipment or power of uplink transmission from the different user equipment to the second base station, to report the measured transmission power to the first base station, to receive transmission power control information, indicating that the downlink transmission power or the uplink transmission power is to be reduced, from the first base station, and to transmit the received transmission power control information to the second base station, wherein the downlink transmission power or the uplink transmission power may be reduced by the second base station based on the transmission power control information.

A base station for controlling transmission power for reducing interference in a wireless communication system in accordance with another embodiment of the present invention to achieve the objects of the present invention may include a reception module for receiving an uplink signal from a first user equipment, a transmission module for transmitting a downlink signal to the first user equipment, and a processor for controlling the base station including the reception module and the transmission module, wherein the processor may be configured to receive transmission power control information, indicating that power of downlink transmission from the base station to the first user equipment or power of uplink transmission from the first user equipment to the base station is to be reduced, from a second user equipment, and to reduce the downlink transmission power or the uplink transmission power based on the received transmission power control information, wherein the downlink transmission power or the uplink transmission power may be measured by the second user equipment and the measured transmission power is reported to the second base station and the transmission power control information is provided from the second base station to the second user equipment.

It is to be understood that both the foregoing general description and the following detailed description of the present invention are exemplary and explanatory and are intended to provide further explanation of the invention as claimed.

Advantageous Effects

According to the present invention, it is possible to provide a method and apparatus for reducing intercell interference in which boundaries of subframes of a micro cell are aligned and transmission power is adjusted to reduce intercell interference that occurs in a heterogeneous network.

Advantages of the present invention are not limited to those described above and other advantages will be clearly understood by those skilled in the art from the following description.

DESCRIPTION OF DRAWINGS

The above and other objects, features and other advantages of the present invention will be more clearly understood from the following detailed description taken in conjunction with the accompanying drawings, in which.

BEST MODE

Figure 1:
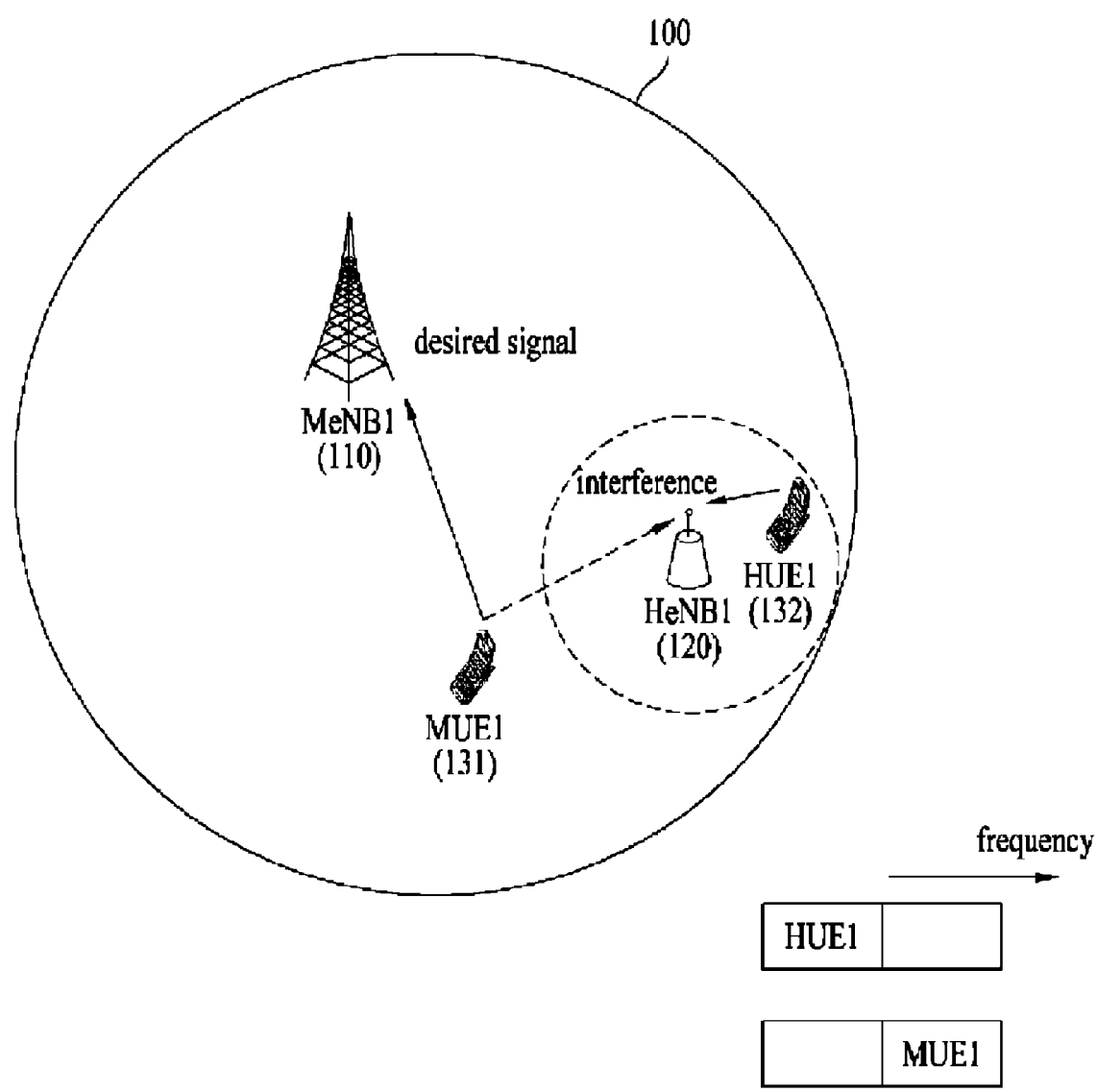
FIG. 1 illustrates a wireless communication system.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The BS (eNB) described in this disclosure conceptually includes a cell or sector. The term "relay" may be replaced with another term such as "Relay Node (RN)" or "Relay Station (RS)". The term "terminal" may be replaced with another term such as "User Equipment (UE)", "Mobile Station (MS)", "Mobile Subscriber Station (MSS)", or "Subscriber Station (SS)".

Specific terms used in the following description are provided for better understanding of the present invention and can be replaced with other terms without departing from the spirit of the present invention.

In some instances, known structures and devices are omitted or shown in block diagram forth, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

The following technologies can be applied to a variety of wireless access technologies such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA). CDMA may be implemented as a wireless technology (or radio technology) such as Universal Terrestrial Radio Access (UTRA) or CDMA2000. TDMA may be implemented as a wireless technology such as Global System for Mobile communications (GSM)/General Packet Radio Service (GPRS)/Enhanced Data Rates for GSM Evolution (EDGE). OFDMA may be implemented as a wireless technology such as Institute of Electrical and Electronics Engineers (IEEE) 802.11 (Wi-Fi), IEEE 802.16 (WiMAX), IEEE 802-20, or Evolved UTRA (E-UTRA). UTRA is a part of the Universal Mobile Telecommunications System (UMTS). 3rd Generation Partnership Project (3GPP) long term evolution (LTE) is a part of the Evolved UMTS (E-UMTS) which uses E-UTRA. 3GPP LTE employs OFDMA in downlink and employs SC-FDMA in uplink. LTE-Advanced (LTE-A) is an evolution of 3GPP LTE. WiMAX may be explained by the IEEE 802.16e standard (WirelessMAN-OFDMA Reference System) and the advanced IEEE 802.16m standard (WirelessMAN-OFDMA Advanced System). Although the following description focuses on the 3GPP LTE and 3GPP LTE-A system for clarity, the spirit of the present invention is not limited to the 3GPP LTE and 3GPP LTE-A system.

Figure 2:
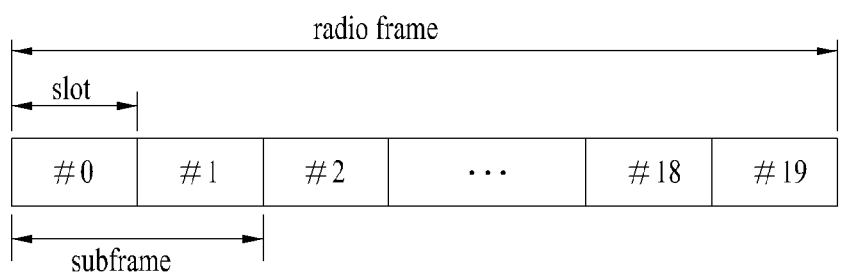
FIG. 2 illustrates a structure of a radio frame used in a 3GPP LTE system.

FIG. 2 illustrates the structure of a radio frame used in the 3GPP LTE system. A radio frame includes 10 subframes and each subframe includes 2 slots in the time domain. A unit time in which one subframe is transmitted is defined as a Transmission Time Interval (TTI). For example, one subframe may have a length of 1 ms and one slot may have a length of 0.5 ms. One slot may include a plurality of OFDM symbols in the time domain. Because the 3GPP LTE system uses OFDMA in downlink, an OFDM symbol represents one symbol period. One symbol may be referred to as an SC-FDMA symbol or a symbol period in the uplink. A Resource Block (RB) is a resource allocation unit which includes a plurality of consecutive subcarriers in a slot. This radio frame structure is purely exemplary. Thus, the number of subframes included in a radio frame, the number of slots included in a subframe, or the number of OFDM symbols included in a slot may vary in various ways.

Figure 3:
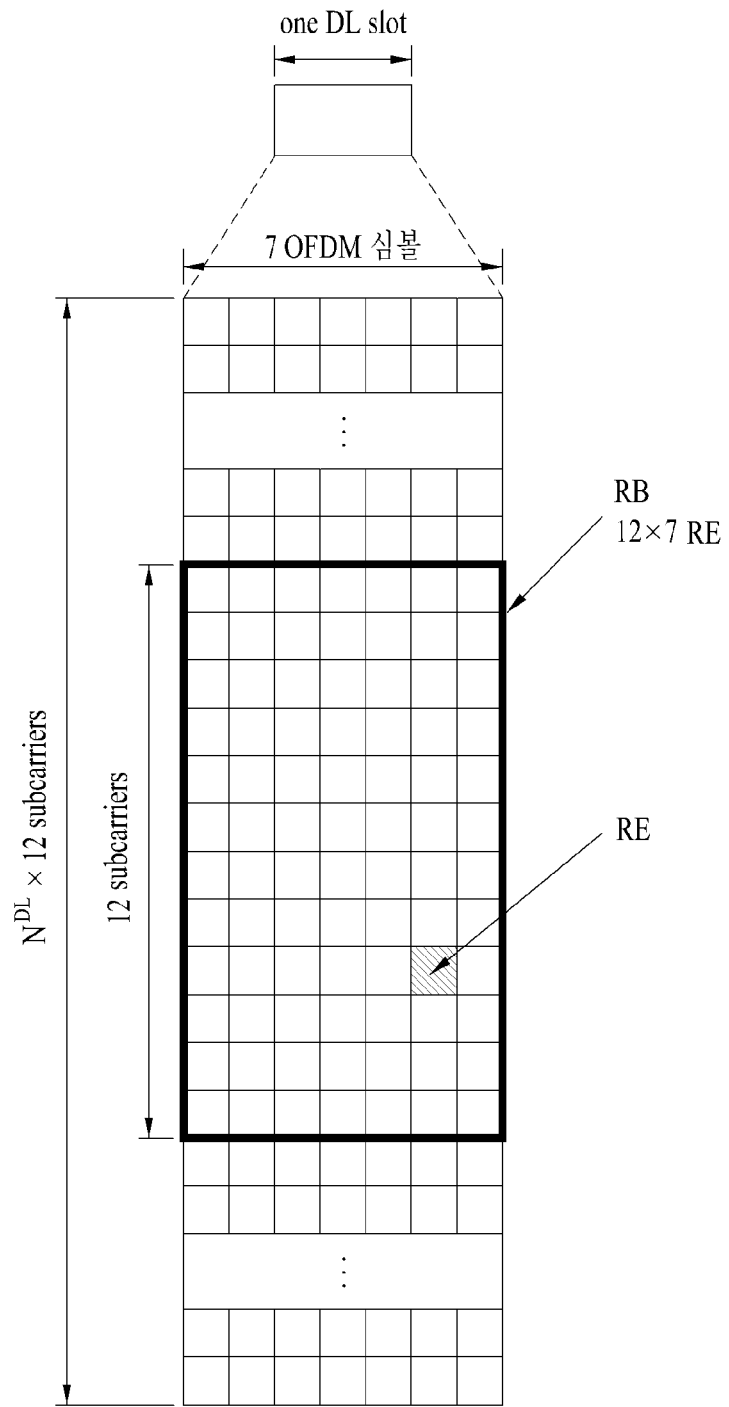
FIG. 3 illustrates, a resource grid in a downlink slot.

FIG. 3 illustrates a resource grid in a downlink slot. Although one downlink slot includes 7 OFDM symbols in the time domain and one RB includes 12 subcarriers in the frequency domain in the example of FIG. 3, the present invention is not limited to this example. For example, one slot may include 6 OFDM symbols when extended CPs are applied while one slot includes 7 OFDM symbols when normal Cyclic Prefixes (CPs) are applied. Each element on the resource grid is referred to as a resource element (RE). One resource block (RB) includes 12×7 resource elements. The number of RBs ($N^{DL}$) included in one downlink slot is determined based on a downlink transmission bandwidth. The structure of the uplink slot may be identical to the structure of the downlink slot.

Figure 4:
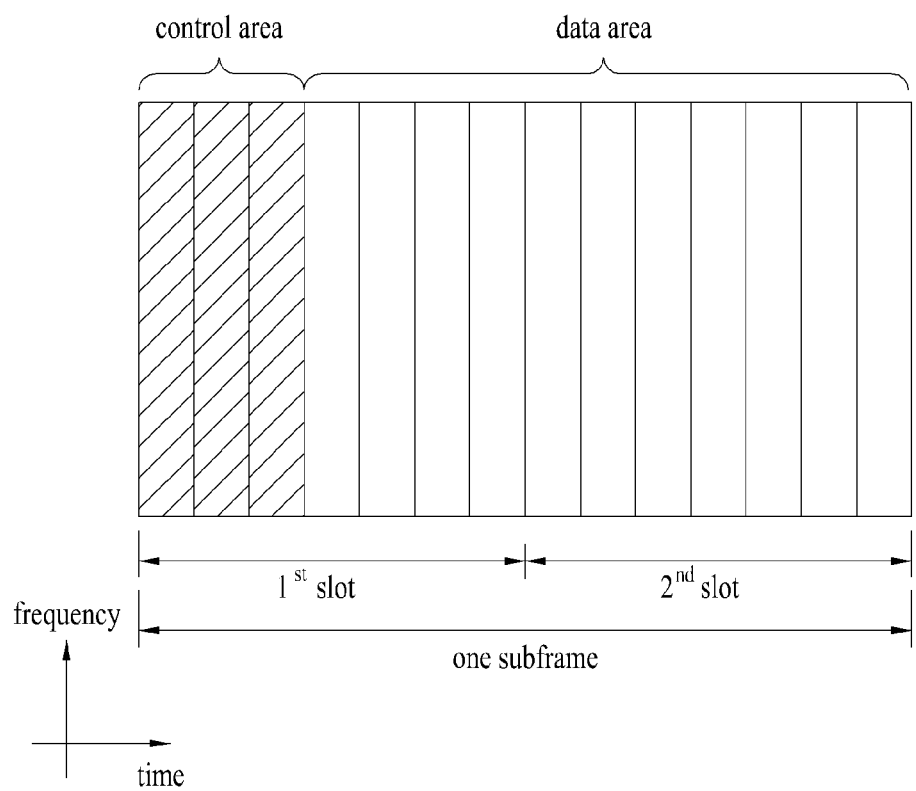
FIG. 4 illustrates a structure of a downlink subframe.

FIG. 4 illustrates the structure of a downlink subframe. Up to the first 3 OFDM symbols of a first slot within one subframe correspond to a control area to which a control channel is allocated. The remaining OFDM symbols correspond to a data area to which a Physical Downlink Shared Channel (PDSCH) is allocated. Downlink control channels used in the 3GPP LTE system include, for example, a Physical Control Format Indicator Channel (PCFICH), a Physical Downlink Control Channel (PDCCH), and a Physical Hybrid automatic repeat request Indicator Channel (PHICH). The PCFICH is transmitted in the first OFDM symbol of a subframe and includes information regarding the number of OFDM symbols used to transmit a control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or includes an uplink transmission power control command for a UE group. The PDCCH may include a resource allocation and transmission format of a Downlink Shared Channel (DL-SCH), resource allocation information of an Uplink Shared Channel (UL-SCH), paging information of a Paging Channel (PCH), system information of the DL-SCH, information regarding resource allocation of a higher layer control message such as a Random Access Response (RAR) that is transmitted in the PDSCH, a set transmission power control commands for individual UEs in a UE group, transmission power control information, and information regarding activation of Voice over IP (VoIP). A plurality of PDCCHs may be transmitted within the control area. The UE may monitor the plurality of PDCCHs. The PDCCHs are transmitted in an aggregation of one or more consecutive Control Channel Elements (CCEs). Each CCE is a logical allocation unit that is used to provide the PDCCHs at a coding rate based on the state of a radio channel. The CCE corresponds to a plurality of resource element groups. The format of the PDCCH and the number of available bits are determined based on a correlation between the number of CCEs and a coding rate provided by the CCEs. The base station (eNB) determines the PDCCH format according to a DCI that is transmitted to the UE, and adds a Cyclic Redundancy Check (CRC) to control information. The CRC is masked with a Radio Network Temporary Identifier (RNTI) according to the possessor or usage of the PDCCH. If the PDCCH is associated with a specific UE, the CRC may be masked with a cell-RNTI (C-RNTI) of the UE. If the PDCCH is associated with a paging message, the may be masked with a paging indicator identifier (P-RNTI). If the PDCCH is associated with system information (more specifically, a system information block (SIB)), the CRC may be masked with a system information identifier and a system information RNTI (SI-RNTI). To indicate a random access response that is a response to transmission of a random access preamble from the UE, the CRC may be masked with a random access-RNTI (RA-RNTI).

Figure 5:
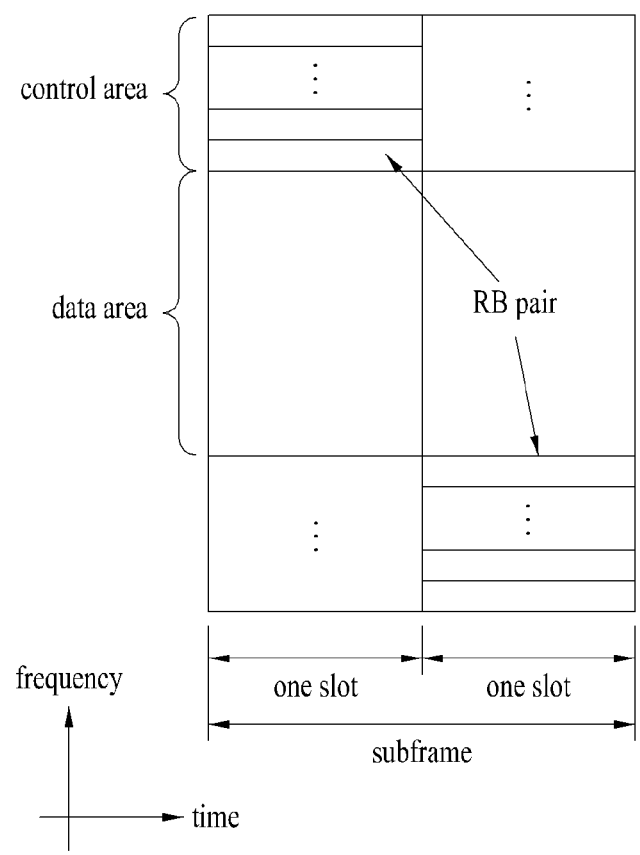
FIG. 5 illustrates a structure of an uplink subframe.

FIG. 5 illustrates the structure of an uplink subframe. The uplink subframe may be divided into a control area and a data area in the frequency domain. A Physical Uplink Control Channel (PUCCH) including uplink control information is allocated to the control area. A Physical Uplink Shared Channel (PUSCH) including user data is allocated to the data area. In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

Carrier Aggregation

In a general wireless communication system, typically, a single carrier is considered in uplink and downlink although different bandwidths are set for uplink and downlink. For example, it is possible to provide a wireless communication system based on a single carrier in which the number of carriers constituting each of the uplink and the downlink is 1 and bandwidths of the uplink and the downlink are symmetrical to each other.

The international telecommunication union (ITU) requires that candidate technologies for IMT-Advanced support a bandwidth extended compared to a conventional wireless communication system. However, it is difficult to allocate frequencies of a large bandwidth throughout the world, except for some regions. Thus, as a technology for efficiently using small fragmented bands, a carrier aggregation technology which is also referred to as bandwidth aggregation or spectrum aggregation has been developed to allow a number of physical bands to be combined in the frequency domain to be used as a large logical band.

Carrier aggregation has been introduced in order to support increased throughput, to prevent cost increase due to introduction of broadband RF elements, and to guarantee compatibility with existing systems. Carrier aggregation enables data exchange between a UE and an eNB through a plurality of groups of bandwidth-based carriers, which are defined in a conventional wireless communication system (for example, in the LTE system in the case of the LTE-A system or in the IEEE 802.16e system in the case of the IEEE 802.16m system). Here, bandwidth-based carriers defined in the conventional wireless communication system may be referred to as component carriers (CCs). Carrier aggregation technologies may include, for example, a technology that combines up to 5 CCs to support system bandwidths of up to 100 MHz even though a single CC supports a bandwidth of 5 MHz, 10 MHz or 20 MHz.

In the following description of carrier aggregation, the term "base station" or "eNB" may refer to a macro or micro base station or eNB.

Downlink carrier aggregation may be described as support of downlink transmission of an eNB to a UE using frequency-domain resources (subcarriers or Physical Resource Blocks (PRBs)) in bands of one or more carriers in certain time-domain resources (which are in units of subframes). Uplink carrier aggregation may be described as support of uplink transmission of a UE to an eNB using frequency-domain resources (subcarriers or PRBs) of bands of one or more carriers in certain time-domain resources (which are in units of subframes).

To support carrier aggregation, there is a need to establish a connection or to prepare for connection setup between an eNB and a UE in order to transmit a control channel (PDCCH or PUCCH) and/or a shared channel (PDSCH or PUSCH). For the connection/connection setup for each UE, there is a need to measure and/or report carriers and CCs to be measured and/or reported may be assigned to the UE. That is, CC assignment to a specific UE is a process of configuring CCs (i.e., setting the number and indices of CCs) for use in downlink/uplink transmission to/from the specific UE from among downlink/uplink CCs configured by an eNB, taking into account the capabilities of the specific UE and system environments.

Uplink Timing Advance

Figure 6:
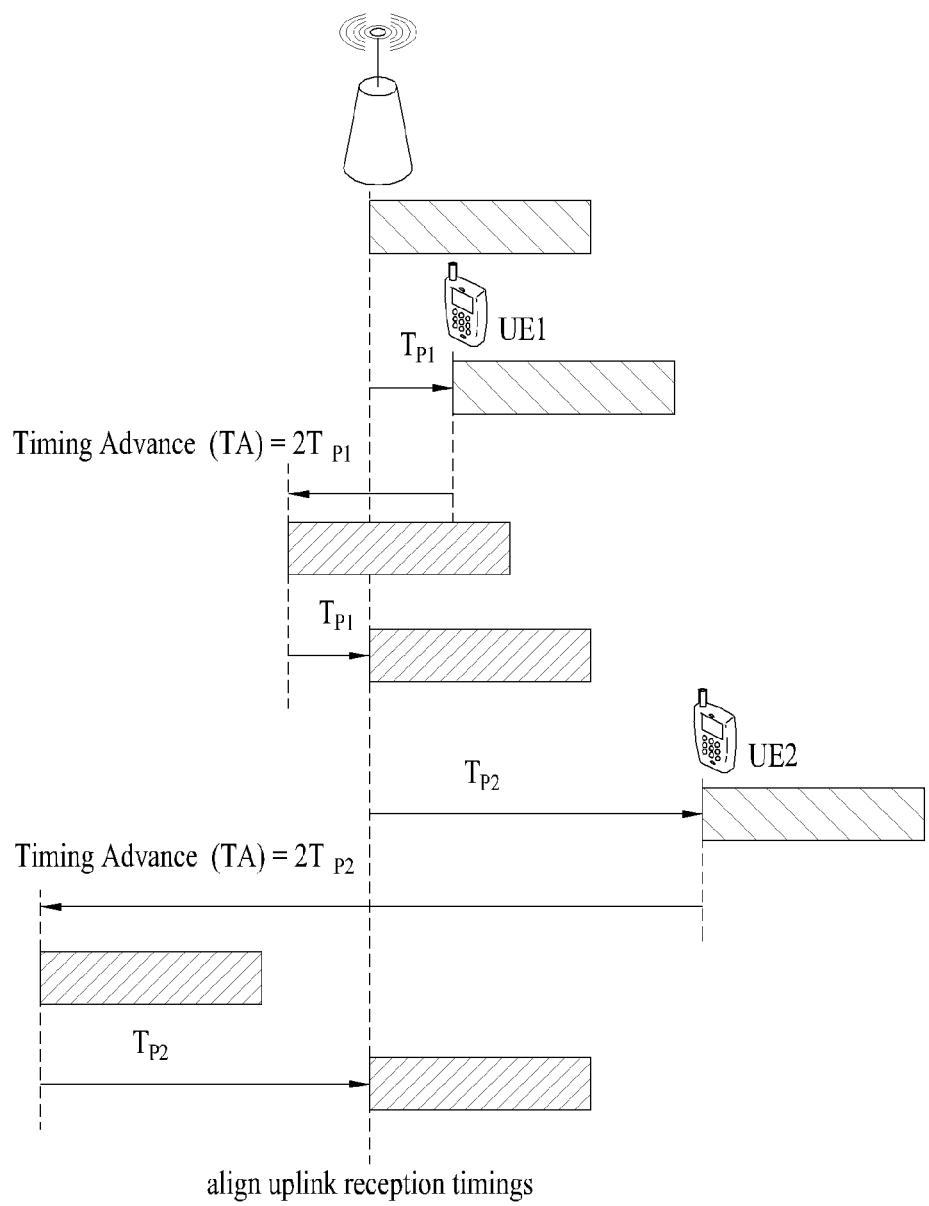
FIG. 6 illustrate general uplink time synchronization between an eNB and a UE.

General uplink timing synchronization (timing advance) between an eNB and a UE is described below with reference to FIG. 6. In the following description, it is assumed that UEs UE1 and UE2 receive services directly from an eNB. It is also assumed that downlink propagation delay from an eNB to a UE and uplink propagation delay from a UE to an eNB are equal. It is also assumed that the timing of downlink subframe transmission of the eNB and the timing of uplink subframe transmission of the UE are equal. Accordingly, when the difference (i.e., propagation delay time) between the timing of transmission of a downlink subframe from the eNB and the timing of reception of the downlink subframe by the first UE UE1 is $T_{P1}$, the difference between the timing of transmission of an uplink subframe corresponding to the downlink subframe from the UE UE1 and the timing of reception of the uplink subframe by the eNB is also $T_{P1}$. The difference between the timing of transmission of an uplink subframe from the UE UE1 and the timing of reception of a downlink subframe corresponding to the uplink subframe by the UE UE1 is $2T_{P1}$. In addition, it is assumed that the UE UE2 is farther from the eNB than the UE UE1. The propagation delay time of a downlink subframe that is received by the second UE UE2 after being transmitted from the eNB may be represented by $T_{P2}$ and the propagation delay time of an uplink subframe that is received by the eNB after being transmitted from the second UE UE2 may be represented by $T_{P2}$. Here, the difference between the timing of transmission of an uplink subframe from the UE UE2 and the timing of reception of a downlink subframe corresponding to the uplink subframe by the UE UE2 is $2T_{P2}$.

The eNB may transmit the same downlink subframe to each UE and may receive an uplink subframe corresponding to the downlink subframe. In this case, when the UEs transmit uplink subframes at different timings, the eNB may receive the uplink subframes from the UEs at different timings. The eNB may align the reception timings of uplink subframes from the UEs according to a predetermined rule such that the reception timings are equal. For example, the eNB may align the reception timings of uplink subframes from the UEs according to a predetermined rule such that the reception timings are equal with respect to the timing of transmission of the downlink subframe from the eNB.

Accordingly, the eNB may instruct the UE UE1 to transmit an uplink subframe with a timing advance of $2T_{P1}$ (i.e., $2T_{P1}$ earlier) and may instruct the UE UE2 to transmit an uplink subframe with a timing advance of $2T_{P2}$ (i.e., $2T_{P2}$ earlier).

In another example, the eNB may align the reception timings of uplink subframes from the UEs such that the reception timings of uplink subframes from the UEs are at predetermined offsets with respect to the timing of transmission of the downlink subframe from the eNB. The timing offsets may be defined based on the frame structure. For example, the timing offset may be defined as "0" when the frame structure complies with type 1 or frequency division duplexing and may be defined as 614 samples when the frame structure complies with type 2 or time division duplexing.

Figure 7:
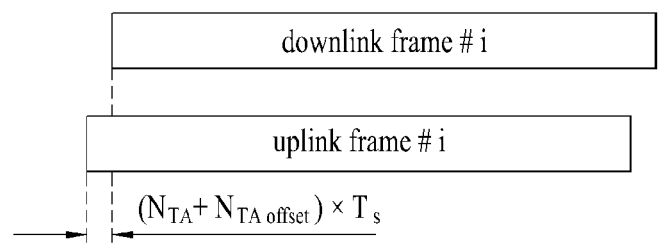
FIG. 7 illustrates an example in which timing advance is applied.

An embodiment in which an eNB provides such a command to a UE is described below with reference to FIG. 7. The UE may acquire a downlink subframe reception timing from a Primary Synchronization Signal (PSS) and a Secondary Synchronization Signal (SSS) transmitted from the eNB and may use the acquired downlink subframe reception timing as a basic uplink transmission timing. The UE may determine the acquired downlink reception timing to be a Physical Random Access Channel (PRACH) transmission timing in an initial random access procedure. A Timing Advance Command (TAC) that is signaled from the eNB to the UE through a random access procedure may include a Timing Advance (TA) value indicating how much the UE is to advance the timing of transmission of an uplink subframe. Accordingly, based on the TA value included in the timing advance command, the UE may determine the uplink transmission timing with respect to the downlink reception timing using the following expression.

$$(N_{TA}+N_{TAoffset}) \times T_S$$  Expression 1

Here, $N_{TA}$ is a timing advance (TA) value that the eNB provides to the UE. The UE may acquire $N_{TA}$ from the eNB and then determine the uplink transmission timing using Expression 1. As a timing offset between a downlink subframe and an uplink subframe corresponding to the downlink subframe, $N_{TA}$ may have, a value equal to the sum of the downlink propagation delay and the uplink propagation delay. The upper limit of $N_{TA}$ may be limited by the size of the coverage of the eNB (for example, 100 km) and may have a range between 0 and 20512 (i.e, $0 \leq NTA \leq 20512$). $N_{TAoffset}$ is a fixed timing offset based on the frame structure and is 0 when the frame structure complies with type 1 or frequency division duplexing and 624 when the frame structure complies with type 2 or time division duplexing. $T_S$ is a sampling time as a basic time unit and has a value of $1/(15000 \times 2048)$ [sec]. The above values Of $N_{TA}$, $N_{TAoffset}$, and $T_S$ are purely exemplary. That is, the values of $N_{TA}$, $N_{TAoffset}$, and $T_S$ are not limited to those described above and may be appropriately selected according to system requirements.

In a heterogeneous network environment in which a macro eNB and a micro eNB are present together, more serious intercell interference may occur than in a homogeneous network environment in which only macro eNBs (or only micro eNBs) are present. For example, due to a maximum transmission power difference of the eNB, a downlink (DL) serving cell (i.e., a macro eNB) selected based on received signal power may differ from an uplink (UL) serving cell (for example, a micro eNB) selected based on path loss.

For example, let us assume that the UE is located nearer the micro eNB than to the macro eNB. Transmission power of the macro eNB is higher than transmission power of the micro eNB. Therefore, even when the UE is located nearer the micro eNB than the macro eNB, the intensity of a downlink signal from the macro eNB may be higher than the intensity of a downlink signal from the micro eNB and thus the macro eNB may be selected as a serving cell. In this case, since the distance between the macro eNB and the UE is greater, the UE may transmit an uplink signal to the macro eNB with higher transmission power to compensate for the greater distance. Here, such uplink transmission with high power may cause interference to the micro eNB located adjacent to the UE.

That is, in the case in which a DL serving cell and a UL serving cell are determined based on received signal power of the UE as in a conventional homogeneous network, a UL signal of a macro UE may cause strong interference to a micro eNB when the macro UE which is being served by the macro eNB is located much nearer to the micro eNB than to the macro eNB. Similarly, in a DL channel, intercell interference may also occur between the micro eNB and the macro eNB since the distance between the UE and the cell which causes interference is small.

When the micro eNB is a CSG micro eNB that is configured to provide services only to a specific UE, serious interference may occur since, when the macro UE has entered the coverage of the micro eNB, the macro UE still communicates with the macro eNB and cannot receive a DL/UL service from the micro eNB even. For example, when a specific macro UE has moved to a place adjacent to a micro eNB, an uplink signal transmitted from the UE to a macro eNB causes serious interference to uplink of the micro eNB.

In this case, when subframe boundaries of the macro eNB and the micro eNB have already been aligned (i.e., have already been adjusted to match each other), it is possible to avoid interference by adjusting frequency or time resources used for uplink/downlink transmission of the UE such that such frequency or time resources are not used by the micro eNB. For example, in the example of FIG. 1, it is possible to perform setting to allow the micro UE (HUE1) to transmit a signal to the micro eNB (HeNB1) avoiding frequency resources through which the macro UE (MUE1) adjacent to the micro eNB (HeNB1) transmits an uplink signal to the macro eNB (MeNB1) with high power.

This interference avoidance operation requires that subframe boundaries of the macro eNB (MeNB) and the micro eNB (HeNB) be aligned (i.e., match each other). Throughout this disclosure, the expression "uplink subframe boundaries of the micro eNB" refers to boundaries between uplink subframes from the micro UE to the micro eNB and "downlink subframe boundaries of the micro eNB" refers to boundaries between downlink subframes from the micro eNB to the micro UE. Similarly, the expression "uplink subframe boundaries of the macro eNB" refers to boundaries between uplink subframes from the macro UE to the macro eNB and "downlink subframe boundaries of the macro eNB" refers to boundaries between downlink subframes from the macro eNB to the macro UE.

Throughout this disclosure, when it is stated that uplink (or downlink) subframe boundaries of the macro eNB and the micro eNB are aligned, this also means that uplink (or downlink) subframe boundaries of the macro eNB and the micro eNB are aligned within an allowable error range (for example, within a Cyclic Prefix (CP) in the case of an OFDM-based system). It is also possible to consider the case in which the macro UE (MUE1) and the micro UE (HUE1) perform transmission for interference avoidance in the time domain. That is, it is possible to employ a configuration in which the HUE1 does not perform transmission when the MUE1 performs transmission and the MUE1 does not perform transmission when the HUE1 performs transmission. In this case, subframe boundaries of the macro eNB and subframe boundaries of the micro eNB need to be aligned. That is, to perform the operation for avoiding interference as described above by dividing and using time/frequency resources of the macro eNB (MeNB) and the micro eNB (HeNB) such that the time/frequency resources of the macro eNB (MeNB) do not overlap those of the micro eNB (HeNB); it is basically required that the subframe boundaries of the macro eNB and the micro eNB be aligned.

In the case of a general eNB and UE, the eNB may estimate propagation delay between the UE and the eNB based on the time point (i.e., timing) at which the eNB has received an uplink signal transmitted from the UE and may then transmit a Timing Advance Command (TAC) instructing the UE to advance the timing of uplink transmission to compensate for the propagation delay, thereby achieving uplink timing synchronization of the UE. However, the micro eNB does not perform uplink transmission to the macro eNB. Accordingly, such a method, in which the eNB achieves uplink timing synchronization of the UE by providing a TAC to the UE based on the time point at which the eNB has received an uplink signal from the UE, cannot be directly applied to achieve timing synchronization of the micro eNB.

In the following, methods for aligning subframe boundaries of a micro eNB according to the present invention are described in detail. The present invention suggests two methods of embodiments 1 and 2 that are applied when a micro eNB can receive a downlink signal from a macro eNB and when a micro eNB cannot receive a downlink signal from a macro eNB, respectively.

Embodiment 1

Embodiment 1 relates to a method for aligning subframe boundaries of a micro eNB when the micro eNB can receive a downlink signal from a macro eNB.

Figure 8:
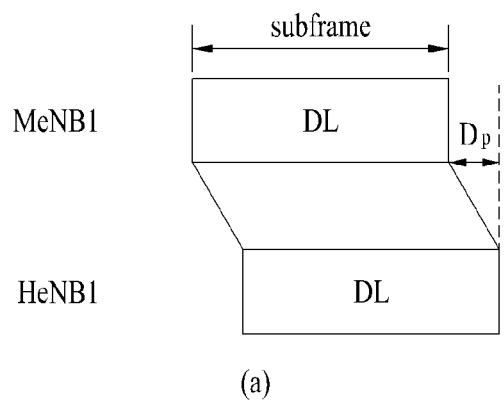
FIG. 8 illustrates the difference between subframe boundaries.
Figure 8:
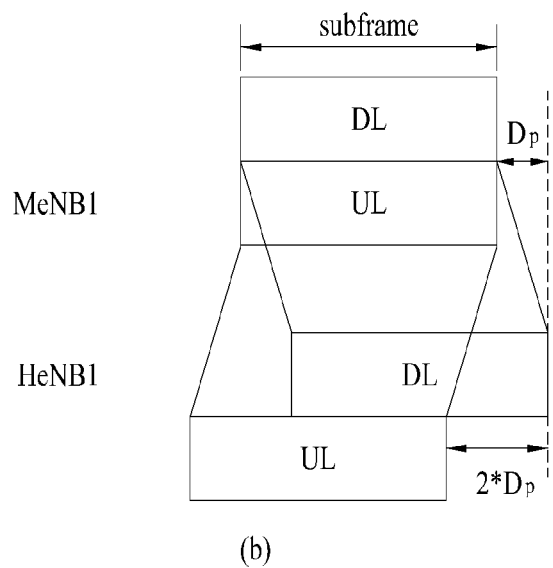

FIG. 8 illustrates a method in which a micro eNB acquires downlink subframe boundaries (FIG. 8(a)) and aligns subframe boundaries of the micro eNB (FIG. 8(b)).

Here, it is assumed that the micro eNB can receive a downlink signal of the macro eNB. In this case, the micro eNB can acquire downlink subframe boundaries of the macro eNB as shown in FIG. 8(a). Here, propagation delay Dp from the macro eNB to the micro eNB is present. The micro eNB can acquire downlink subframe boundaries through the same procedure as in the UE.

To align subframe boundaries of an uplink signal from the macro UE to the macro eNB and subframe boundaries of an uplink signal from the micro UE to the micro eNB, there is a need to advance the timing of transmission of an uplink subframe from the micro UE to the micro eNB by 2Dp which corresponds to two times the propagation delay Dp.

Specifically, when the MUE1 is located adjacent to the HeNB1 as shown in FIG. 1, the propagation delay between the MUE1 and the MeNB1 has a value similar to the propagation delay between the HeNB1 and the MeNB1. This is because it can be assumed that the distance (or propagation delay) between the MeNB1 and the MUE1 is substantially equal to the distance (or propagation delay) between the MeNB1 and the HeNB1 since the distance between the MeNB1 and the MUE1 is sufficiently greater than the distance between the HeNB1 and the MUE1. In addition, the MUE1 transmits an uplink signal with a timing advance of about 2Dp with respect to a downlink subframe and the uplink signal transmitted from the MUE1 (i.e., an interference signal for the HeNB1) arrives at the HeNB1 with very little propagation delay. Accordingly, it is possible to align subframe boundaries of an uplink signal from the HUE1 to the HeNB1 with subframe boundaries of an uplink signal from the MUE1 to the MeNB1 (i.e., an interference signal provided from the MUE1 to the HeNB1) by allowing boundaries of an uplink subframe from the HUE1 to the HeNB1 to have a timing advance of about 2Dp with respect to (or relative to) boundaries of a downlink subframe from the MeNB1 to the HeNB1.

FIG. 8(b) illustrates a method for aligning subframe boundaries suggested in the present invention. That is, as shown in FIG. 8(b), the present invention suggests a method in which the micro eNB allows boundaries of uplink subframes from micro UEs within the coverage of the micro eNB to the micro eNB to start earlier than boundaries of a downlink subframe from the macro eNB to the micro eNB by a time corresponding to two times the propagation delay Dp between the macro eNB and the micro eNB. As a result, it is possible to align boundaries of an uplink subframe from the micro UE to be aligned with boundaries of an uplink subframe from the macro UE.

To allow the micro eNB to adjust the timing of an uplink signal from the micro UE as described above, the micro eNB needs to know boundaries of a downlink subframe from the macro eNB and the propagation delay from the macro eNB to the micro eNB (or the propagation delay from the macro eNB to a macro UE adjacent to the micro eNB) which is denoted by "Pd" in FIG. 8.

However, the micro eNB cannot calculate the value of the propagation delay Dp since micro eNB knows only boundaries of downlink subframes from the macro eNB such that the micro eNB cannot know the timing of transmission of a downlink signal from the macro eNB. Accordingly, the macro eNB needs to provide a timing advance command (TAC) to the micro eNB. However, since an uplink from the micro eNB to the macro eNB is not present, the macro eNB has no means for measuring a timing advance value with respect to the micro eNB.

Accordingly, the present invention suggests that the macro eNB acquire a propagation delay Dp or a timing advance value 2Dp for the micro eNB in an indirect manner and provide an appropriate timing advance value for use by the micro eNB to the micro eNB.

According to a currently used timing advance scheme (for example, an uplink timing synchronization scheme), it is not possible for a macro eNB to provide a timing advance value to a micro eNB at an arbitrary time since, according to the currently used timing advance scheme, each UE determines the timing of uplink transmission at the current time point by continuously accumulating timing adjustment values (or timing advance values) received from an eNB. That is, from the viewpoint of the eNB, the timing adjustment value is a value indicating how much to adjust the uplink timing of the UE relative to the timing of latest uplink transmission from the UE. Namely, the macro eNB cannot acquire an absolute timing advance adjustment value at an arbitrary time since the timing adjustment value is given as a relative value. Accordingly, when the UE has failed to receive a timing advance command (TAC) or when the macro eNB did not accumulate all TACs of the UE, it may occur that the macro eNB cannot correctly determine the timing of uplink transmission of a macro UE adjacent to the micro eNB.

Figure 9:
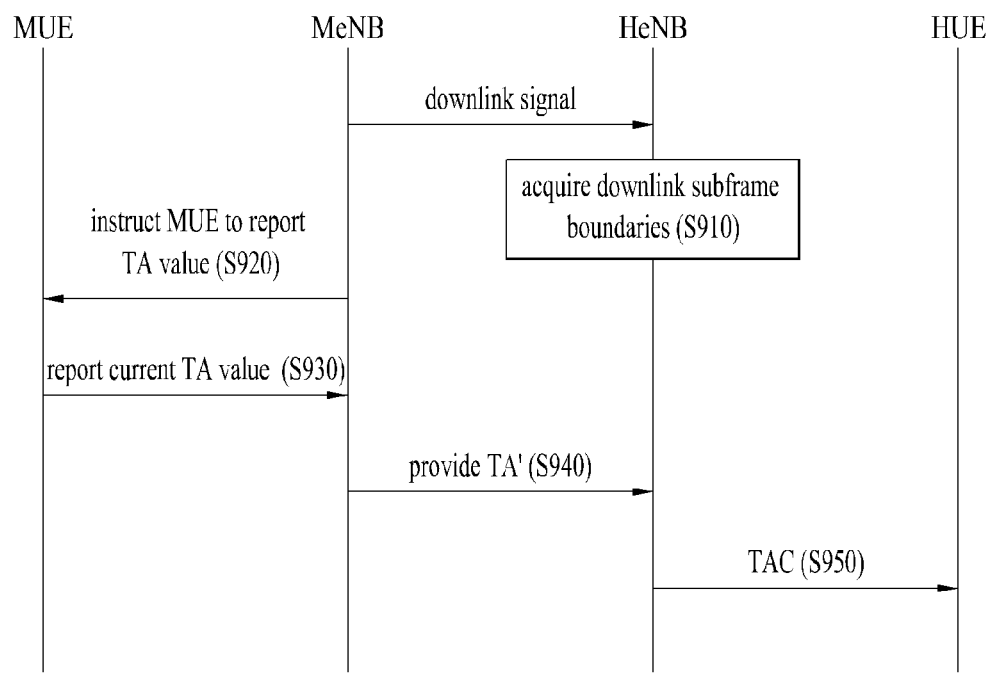
FIG. 9 is a signal flow diagram illustrating a method for aligning subframe boundaries according to an embodiment of the present invention.

Accordingly, the present invention suggests a method in which a macro eNB instructs a macro UE adjacent to a micro eNB to report a currently used timing advance value in order to determine a correct uplink transmission timing. FIG. 9 is a signal flow diagram for this embodiment.

As shown in FIG. 9, in step S910, a micro eNB (HeNB) may receive a downlink signal from a macro eNB (MeNB) to acquire downlink subframe boundaries. In step S920, the MeNB may transmit a signal instructing a macro UE (MUE) to report a timing advance (TA) value to the MUE. Here, the MUE is a user equipment that is located adjacent to the HeNB. In step S930, the MUE may report a TA value currently used by the MUE to the MeNB through an uplink signal. In step S940, the MeNB may provide an appropriate timing advance value (TA') to the HeNB using the TA value received from the MUE. In step S950, the HeNB may provide a timing advance command (TAC) which allows boundaries of uplink subframes, which are transmitted from micro UEs within the coverage of the HeNB to the HeNB, to start earlier than boundaries of downlink subframes from the MeNB to the HeNB by the appropriate timing advance value TA'. This allows boundaries of uplink subframes from the micro UE to be aligned with boundaries of uplink subframes from the macro UE. Step S910 is not necessarily performed after or before steps S920 and S930 and may be performed separately (or simultaneously) from steps S920 and S930.

The present invention suggests a method in which a macro eNB estimates propagation delay from the macro eNB to each micro eNB based on propagation delay of a macro UE adjacent to each micro eNB. In the example of FIG. 1, since the MUE1 is adjacent to the HeNB1, it is possible to align boundaries of uplink subframes of the MUE1 and boundaries of uplink subframes of the HUE1 within an allowable error range if the HeNB1 uses a timing advance value that is equal or similar to that of the MUE1. In addition, since the macro eNB receives a report of the intensity of an adjacent cell signal measured by each macro UE at intervals of a predetermined period, the macro eNB can determine which macro UE is adjacent to which micro eNB. Accordingly, the macro eNB can provide a timing advance value of a macro UE adjacent to a micro eNB to the micro eNB. The micro eNB may acquire boundaries of downlink subframes of the macro eNB and may align boundaries of uplink subframes using the timing advance value provided from the macro eNB.

Alternatively, the macro eNB may instruct a macro UE adjacent to a micro eNB to provide a timing advance value used by the macro UE to the micro eNB. When it is difficult for the macro UE to transmit a PUCCH and/or a PUSCH directly to the micro eNB, the macro UE may deliver the timing advance value to the micro eNB as instructed by the macro eNB through a random access procedure or the like.

Figure 10:
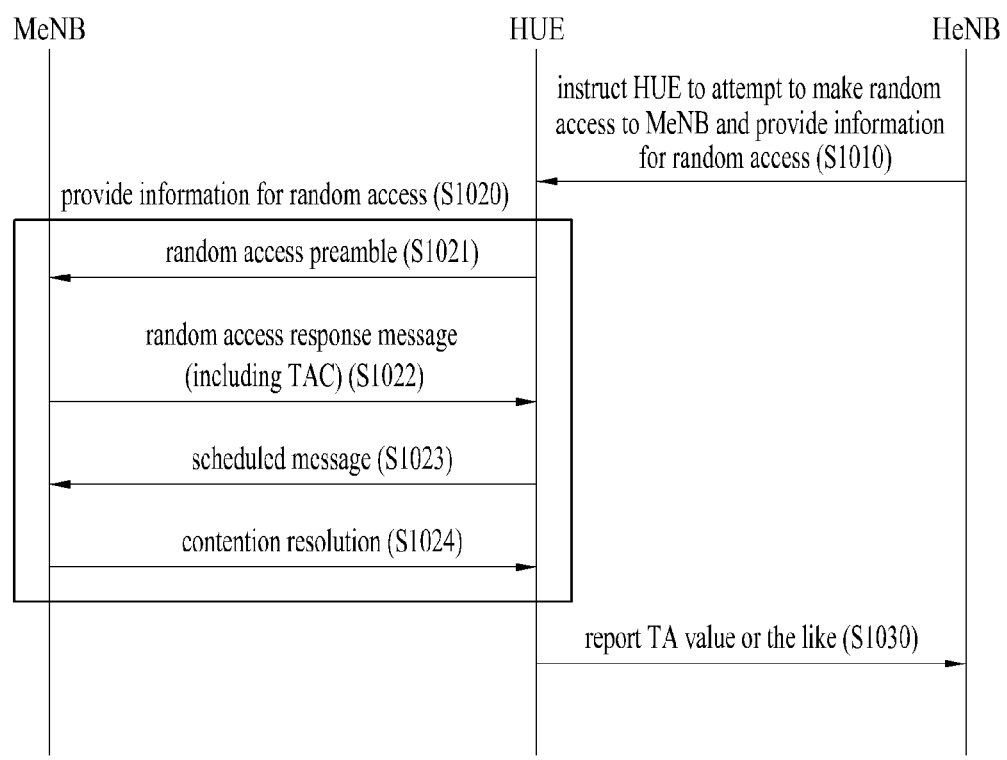
FIG. 10 is a signal flow diagram illustrating a method for aligning subframe boundaries according to another embodiment of the present invention.

In addition, the present invention suggests a method in which a micro UE attempts to make random access to a macro eNB and reports a timing advance value acquired through the random access procedure to the micro eNB. Since the micro eNB generally has a small cell coverage, it can be assumed that the micro UE is located adjacent to the micro eNB. In addition, the distance between the macro eNB and the micro eNB is sufficiently greater than the distance between the micro eNB and the micro UE. Therefore, it can be assumed that the distance between the macro eNB and the micro eNB (propagation delay from the macro eNB to the micro eNB) is substantially equal to the distance between the macro eNB and the micro UE (or propagation delay from the macro eNB to the micro UE). Therefore, a timing advance value for use by the micro eNB may be substantially equal to that of the micro UE. FIG. 10 is a signal flow diagram for this embodiment.

As shown in FIG. 10, in step S1010, a micro eNB (HeNB) may instruct a micro UE (HUE) to attempt random access to a macro eNB (MeNB) and to report the result to the HeNB. Signal transmission in step S1010 may be performed through upper layer signaling (for example, RRC signaling) or through a physical layer channel. In addition, in step S1010, the HeNB may provide the HUE with information, which is to be used for the HUE to attempt random access, such as a cell ID of the macro eNB, a subframe for random access, a resource block (RB) configuration, a physical random access channel (PRACH) preamble index, or transmission power. In step S1020, the HUE may perform a random access procedure with the macro eNB (MeNB).

A general random access procedure may be performed when a UE initially accesses an eNB or a UE has no wireless resources for signal transmission to an eNB. A general contention based random access procedure may be performed in 4 steps. In the first step, which is a message 1 (Msb1) transmission step, the UE may randomly select a random access preamble from a random access preamble set indicated by system information or the like and select PRACH resources for transmitting the random access preamble and then transmit the random access preamble through the selected PRACH resources (S1021). In the second step, which is a message 2 (Msg2) reception step, the UE may receive a random access response and acquire a UL grant, a timing advance command (TAC), or the like included in the random access response (S1022). The timing advance value provided through the message 2 in the random access procedure may be an absolute value. In the third step, which is a message 3 (Msg3) transmission step, the UE may transmit data (i.e., message 3) including an identifier of the UE to the eNB using the UL grant included in the random access response (S1023). In the fourth step, which is a message 4 (Msg4) reception step, when the UE receives a contention resolution message including the identifier of the UE after transmitting the message 3, the UE may determine that the random access procedure has been normally performed and may then terminate the random access procedure (S1024). Details of the random access procedure are not associated with the features of the present invention and therefore a detailed description thereof is omitted herein for clarity of explanation.

Through such a random access procedure, the HUE may receive a timing advance value or the like from the MeNB (through the random access response message in step S1022). In step S1030, the HUE may report the timing advance value (or other information items for intercell coordination) provided from the MeNB to the HeNB.

In addition, the present invention suggests a method in which the macro eNB delivers an estimated timing advance value to the micro eNB through a micro eNB control channel. To allow correct operations of micro UEs that are being served by the micro eNB, the micro eNB needs to transmit a control signal to the micro UEs at a front portion (for example, a control area) of each downlink subframe. That is, the micro UEs need to receive a control signal in 1st to 3rd OFDM symbols of each subframe. Accordingly, the micro eNB cannot receive a physical downlink control channel (PDCCH) from the macro eNB. Accordingly, the present invention suggests the following two methods in which the micro eNB receive a micro cell control channel from the macro eNB.

Figure 11:
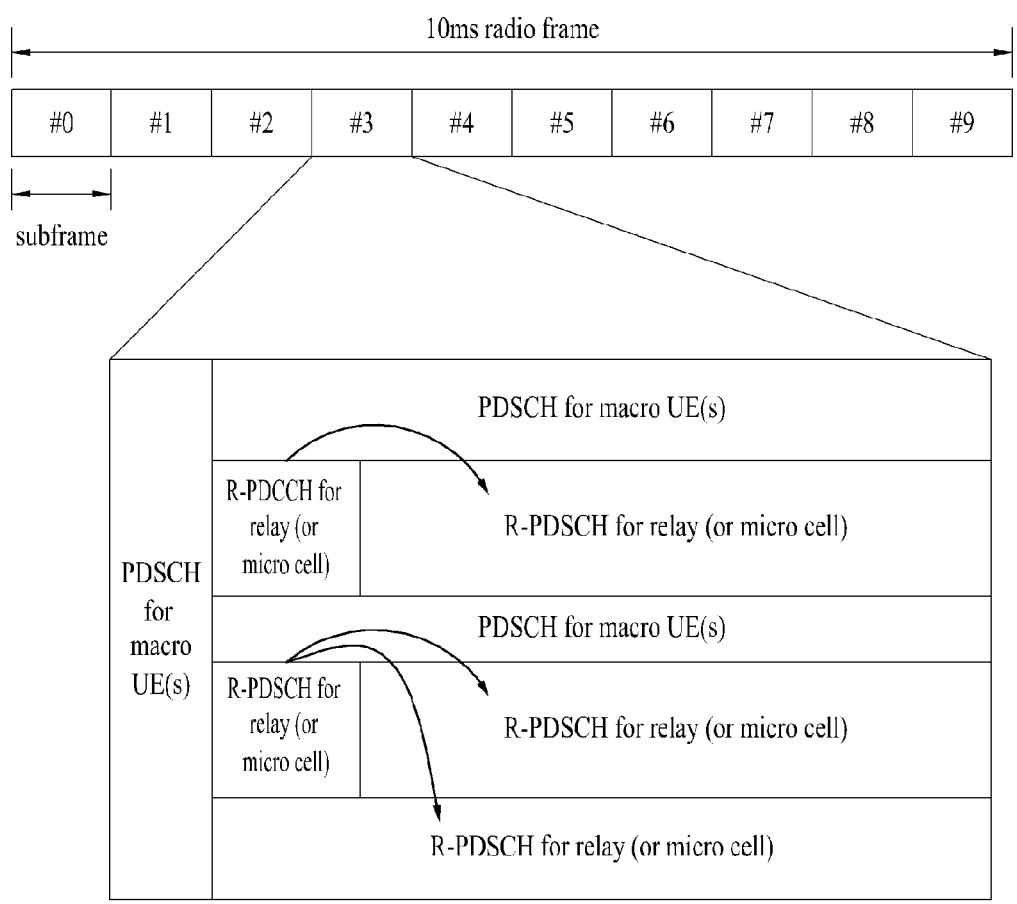
FIG. 11 illustrates an exemplary R-PDCCH and R-PDSCH structure.

In the first method, a micro cell control channel may be formed by reusing a channel designed for a wireless relay (Relay Node (RN)). The channel designed for the RN is a channel which has a structure and format different from a conventional wireless channel in order to support the RN. For example, a PDCCH and a PDSCH for the RN in a backhaul downlink from a donor cell to the RN may be referred to as a Relay-PDCCH (R-PDCCH) and a Relay-PDSCH (R-PDSCH), respectively, to indicate that they are relay-dedicated physical channels. That is, the macro eNB may reuse the structure and format of the R-PDCCH or the R-PDSCH in order to transmit a micro cell control channel to the micro eNB. FIG. 11 illustrates an exemplary structure of the R-PDCCH and the R-PDSCH. The macro eNB may transmit a micro cell control channel to the micro eNB using the R-PDCCH and R-PDSCH structure of FIG. 11. Each micro eNB may read an R-PDCCH mapped to a cell ID of the micro eNB in a DL subframe that has been determined semi-statically and may receive an R-PDSCH according to a corresponding control message. A micro cell control channel of each micro eNB may mapped to an R-PDCCH or an R-PDSCH.

Figure 12:
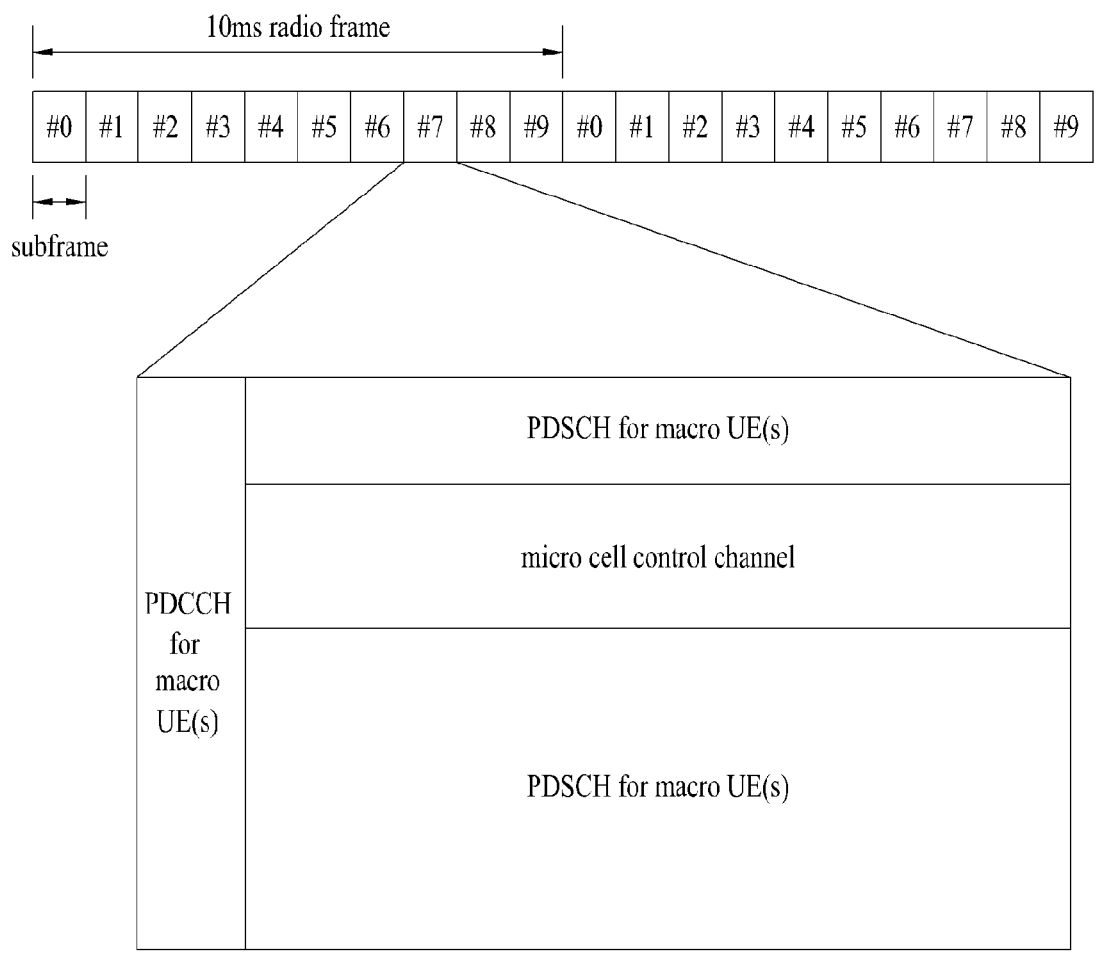
FIG. 12 illustrates exemplary periodic transmission of a micro cell control channel.

In the second method, it is possible to form a micro cell control channel through a PDSCH at a semi-statically determined position. The macro eNB may transmit a subframe index of a subframe, in which the micro cell control channel is present, a period, allocated resources, a used modulation and coding scheme (MCS), and the like through an upper layer signal or system information and may transmit a micro cell control channel to the micro eNB at regular intervals. FIG. 12 illustrates exemplary periodic transmission of a micro cell control channel. For example, the macro eNB may transmit a micro cell control channel once every two radio frames (i.e., at intervals of 2 radio frames).

According to the two methods associated with micro cell control channel transmission, each micro eNB may decode the micro cell control channel without PDCCH decoding by the macro eNB. Each micro eNB may configure a subframe, in which the micro eNB receives a downlink signal from the macro eNB, for example, in order to receive the micro cell control channel described above, as a Multicast Broadcast Single Frequency Network (MBSFN) subframe for UEs which are being served by the micro eNB. The purpose of this is to allow each micro eNB to notify micro UEs that the micro eNB stops downlink signal transmission from the micro eNB to the micro UEs in order to receive a downlink signal from the macro eNB. Upon receiving this notification signal, the micro UEs determines that a cell-specific reference signal is not transmitted in areas other than a PDCCH region in a subframe that has been set as an MBSFN subframe and reflects this determination in reference signal measurement. That is, even when the micro eNB is receiving a micro cell control channel from the macro eNB, micro UEs which are being served by the micro eNB can correctly receive a downlink signal according to a conventional MBSFN subframe reception operation.

The micro cell control channel described above may not only include a timing advance value of each micro eNB but may also include additional information for smooth cooperative communication between the macro eNB and the micro eNB. For example, the additional information may include information (such as a subframe index, a subband index, or a component carrier index) indicating wireless resources that will be used (or should not be used) by each micro eNB, resource allocation information of the macro eNB (such as a used precoding matrix index or transmission power of a subband), power control information of each micro eNB, and the like.

Embodiment 2

Embodiment 2 relates to a method for aligning subframe boundaries of a micro eNB when the micro eNB can receive a downlink signal from a macro eNB.

Here, it is assumed that the micro eNB cannot receive a downlink signal of the macro eNB. In this case, the micro eNB cannot acquire boundaries of downlink subframes directly from the macro eNB. To solve this problem, the present invention suggests a method of aligning boundaries of subframes of the micro eNB with those of the macro eNB with the help of a UE.

A method in which a micro eNB (HeNB1) adjusts the start time of a downlink subframe of the HeNB1, which is transmitted from the micro eNB to the macro UE, with the help of the micro UE (HUE1) is described below with reference to FIG. 13.

The HUE1 may acquire a boundary of a downlink subframe from the HeNB1 (S1310) and acquire a boundary of a downlink subframe from the macro eNB (MeNB1) (S1320). The HUE1 may calculate the time difference between the boundaries of the two downlink subframes (i.e., the time difference between the boundary of the downlink subframe from the HeNB1 and the boundary of the downlink subframe from the MeNB1) and may report the calculated time difference to the HeNB1 (S1330). This allows the HeNB1 to adjust the start time of a downlink subframe of the HeNB1 taking into consideration the time difference reported from the HUE1.

Figure 14:
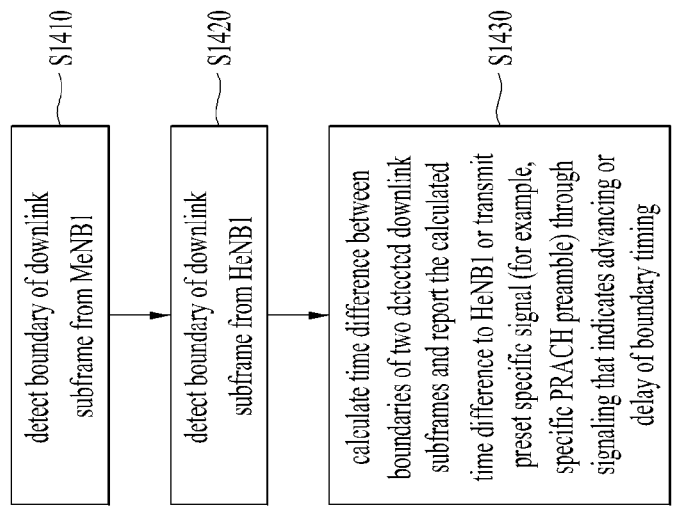
FIG. 14 illustrates a method for aligning downlink subframe boundaries according to another embodiment of the present invention.
Figure 14:
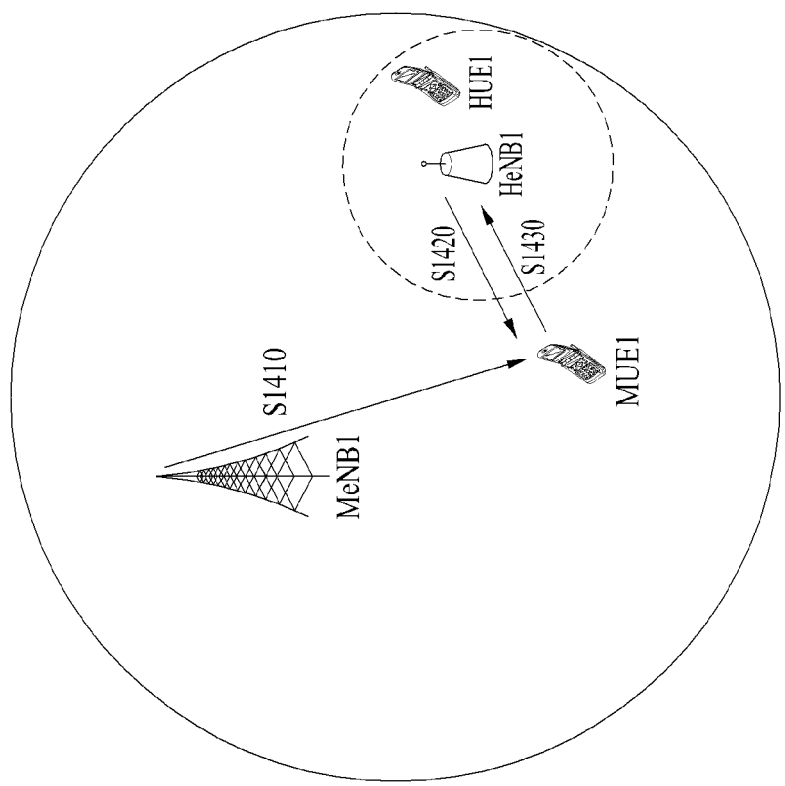

A method in which a micro eNB (HeNB1) adjusts the start time of a downlink subframe of the HeNB1, which is transmitted from the micro eNB to the macro UE, with the help of the micro UE (MUE1) is described below with reference to FIG. 14.

Figure 13:
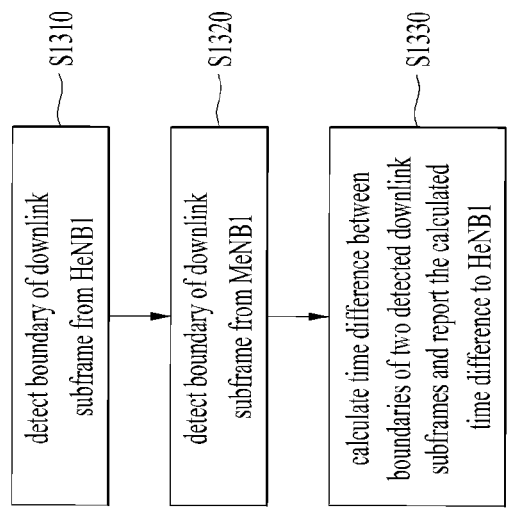
FIG. 13 illustrates a method for aligning downlink subframe boundaries according to an embodiment of the present invention.
Figure 13:
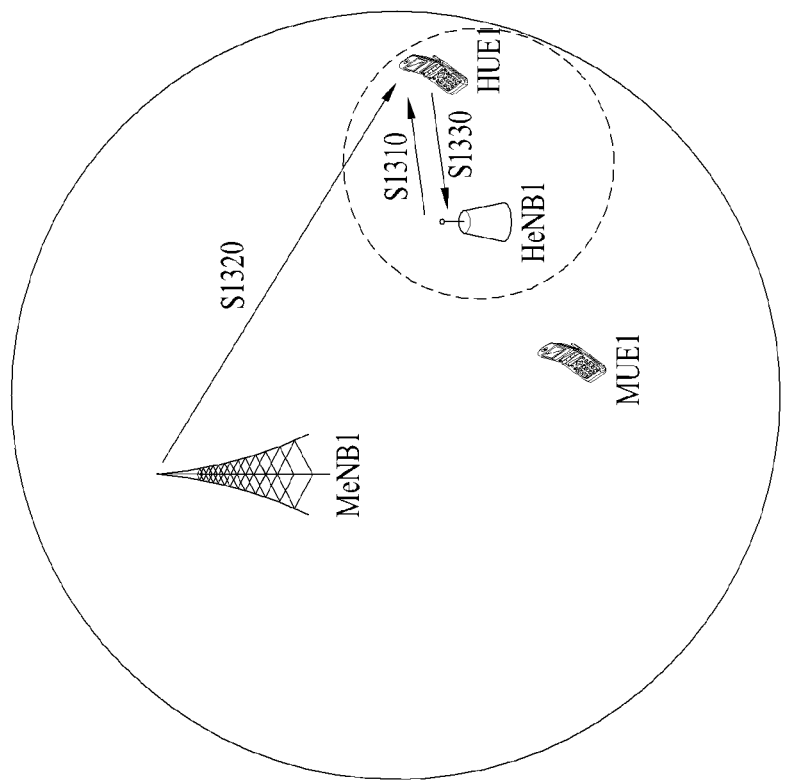

In the case of a downlink subframe, this method may be performed in the same manner as in the method of FIG. 13. For example, the MUE1 may acquire a boundary of a downlink subframe from the macro eNB (MeNB1) (S1410) and acquire a boundary of a downlink subframe from the HeNB1 (S1420). The MUE1 may calculate the time difference between the boundaries of the two downlink subframes (i.e., the time difference between the boundary of the downlink subframe from the MeNB1 and the boundary of the downlink subframe from the HeNB1) and may report the calculated time difference to the HeNB1 (S1430). This allows the HeNB1 to adjust the start time of a downlink subframe of the HeNB1 taking into consideration the time difference reported from the MUE1.

It is also possible to simplify the operation of the macro UE for reporting the time difference between the boundaries of the downlink subframes for the macro UE. That is, the macro UE may transmit a predetermined specific signal (for example, a specific PRACH preamble signal) to the micro eNB instead of transmitting information associated with the time difference between the boundaries of the two downlink subframes. When the micro eNB is a CSG eNB, the macro UE cannot transmit a PUSCH or the like to the micro eNB and therefore the macro UE may need to use a message such as, for example, a PRACH preamble transmission message used in the random access procedure in order to report the time difference to the micro eNB. Upon detecting the specific signal, the micro eNB may analyze the specific signal and determine that the specific signal is a signal requesting the micro eNB to advance or delay the boundary of the downlink subframe of the micro eNB. Accordingly, the micro eNB may then perform an operation for adjusting the boundary of the subframe.

On the other hand, a micro eNB may align a boundary of an uplink subframe with a boundary of an uplink subframe of a macro eNB with the help of a macro UE. The micro eNB may detect an uplink signal of a macro UE that is located near the micro eNB. The micro eNB may estimate an uplink transmission timing advance value of the macro UE based on the uplink signal of the macro UE. Accordingly, the micro eNB can align a boundary of an uplink subframe of the micro eNB with the timing of uplink transmission of the macro UE based on the estimated timing advance value. Here, the signal of the macro UE detected by the micro eNB may be an uplink reference signal or a sounding reference signal. To detect an uplink reference signal/sounding reference signal transmitted from the macro UE to the macro eNB, the micro eNB needs to know information associated with the reference signal. To accomplish this, the micro eNB may acquire information (such as a hopping pattern or a sequence used as the reference signal) associated with an uplink reference signal or sounding reference signal used by the macro eNB and the macro UE through a controller of a micro eNB gateway (for example, a femto cell gate) connected to the micro eNB through a wired network.

If the micro eNB aligns boundaries of uplink and downlink subframes of the micro eNB with those of a macro eNB (specifically, those of a macro UE adjacent to the micro eNB) according to the various methods described above, then uplink subframes of the micro eNB, which are transmitted from the micro UE to the micro eNB, start earlier than downlink subframes which are transmitted from the micro eNB to the micro UE. This means that all UEs within the micro eNB have a common timing advance value. In the conventional timing advance command method, an eNB provides a timing advance value to each UE in a UE-specific manner. However, providing the same timing advance value from the micro eNB to all micro UE(s) served by the micro eNB through individual signaling may cause waste of wireless resources. Accordingly, the micro eNB can reduce control signal overhead by transmitting a common timing advance value, which is applied to all UEs belonging to the micro eNB, within a broadcast signal such as system information or by defining a group (or common) timing advance command (TAC) for a plurality of UEs and then delivering a timing advance value to all micro UEs that are served by the micro eNB through single TAC transmission.

As described above, the micro eNB can allow boundary of an uplink subframe or a downlink subframe between the micro eNB and a micro UE to be aligned with a boundary of an uplink subframe or a downlink subframe between a macro eNB and a macro UE, for example, using a method of starting the boundary of the uplink subframe of the micro eNB at timing earlier than the boundary of the downlink subframe of the micro eNB. Although this subframe boundary alignment method is advantageous in terms of coordination of interference with the macro UE, the method has a problem in that the time used to decode uplink data received by the micro eNB or downlink data received by the micro UE is reduced. This is because the current 3GPP LTE system stipulates that an ACK/NACK for the decoding result of data should be transmitted when a specific time (for example, 4 ms) has elapsed after the data is transmitted. Accordingly, when a macro UE causing interference is not present around the micro eNB, the micro eNB may align a boundary of an uplink subframe of the micro eNB with a boundary of a downlink subframe of the micro eNB in order to secure the time used for decoding. That is, the micro eNB may adaptively control the time difference between boundaries of an uplink subframe and a downlink subframe according to whether an adjacent macro UE is present or absent.

Embodiment 3

Embodiment 3 relates to a method for reducing intercell interference when it is difficult to apply embodiments 1 and 2. That is, it is assumed that it is not possible to align a boundary of a subframe of a micro eNB with a boundary of a subframe of a macro eNB as described above.

In this case, the micro eNB may adjust the timing of an uplink subframe from the micro UE to the micro eNB using an appropriate TA value. First, the present invention suggests that the micro eNB align a boundary of an uplink subframe of the micro eNB (i.e., the timing of the micro eNB receiving a boundary of an uplink subframe from the micro UE) with a boundary of a downlink subframe of the micro eNB (i.e., the timing of the micro eNB transmitting a boundary of a downlink subframe to the micro UE). That is, similar to a general eNB, the micro eNB may perform an operation for aligning downlink and uplink timings of the micro eNB, regardless of subframe boundaries of the macro eNB.

Figure 15:
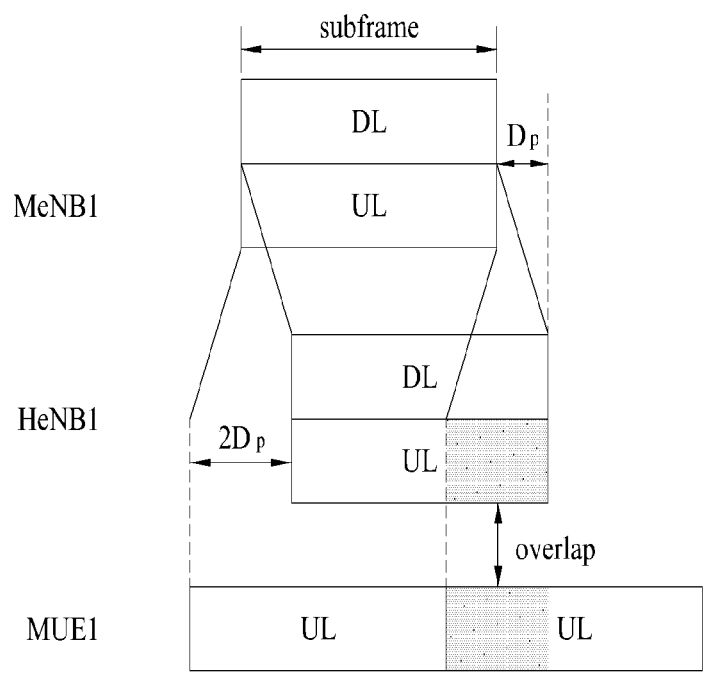
FIG. 15 illustrates the occurrence of uplink interference.

In this case, a part of an uplink subframe of the micro eNB may receive strong interference due to timing advance of a macro UE adjacent to the micro eNB. FIG. 15 illustrates the occurrence of interference due to an uplink signal from a macro UE adjacent to a micro eNB when a boundary of an uplink subframe of the micro eNB is aligned with a boundary of a downlink subframe of the micro eNB. In the example of FIG. 15, a portion of an uplink (UL) subframe of HeNB1 overlaps a portion of a UL subframe from MUE1 and therefore interference may occur at the overlapping portion.

Figure 16:
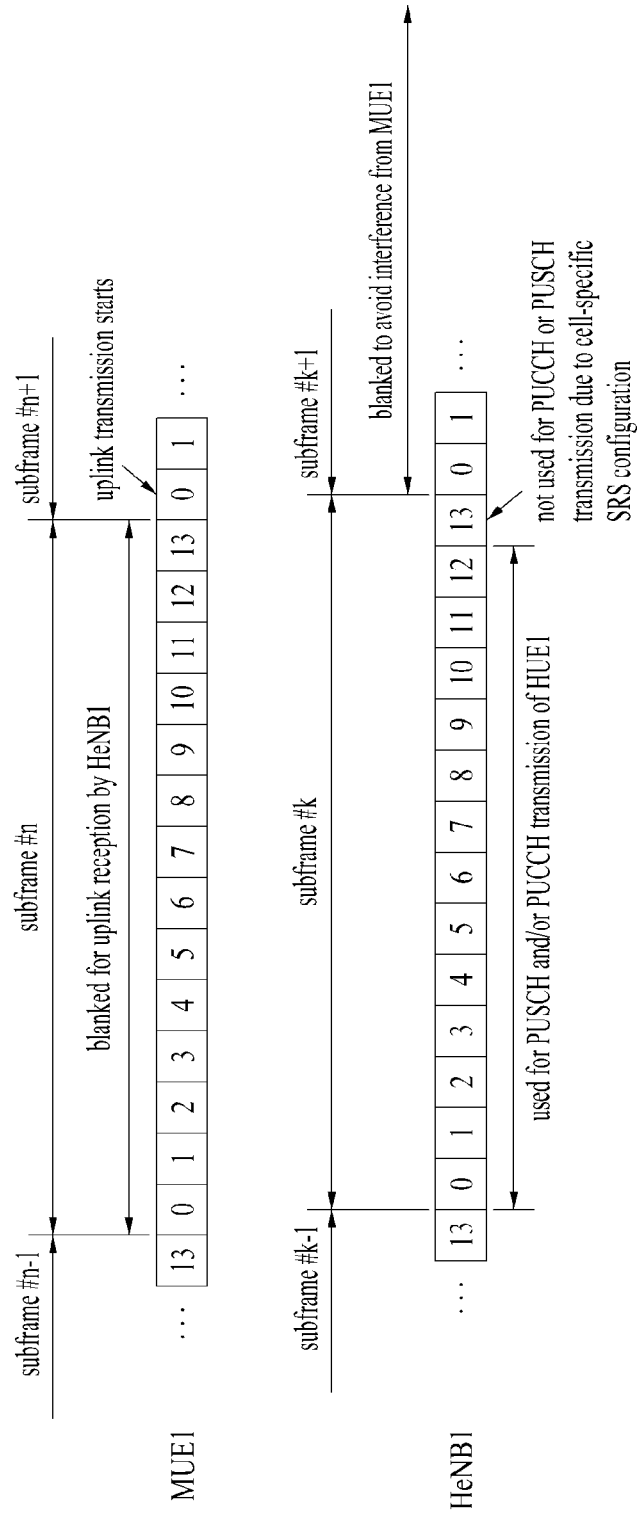
FIG. 16 illustrates a method for reducing interference according to an embodiment of the present invention.

To avoid such interference, the present invention suggests that the micro eNB set all or part of uplink subframes used by the micro eNB as a cell-specific Sounding Reference Signal (SRS) configuration. Since a specific subframe is set as a cell-specific SRS subframe, a PUSCH or a PUCCH of the micro UE is not transmitted in the last SC-FDMA symbol of the subframe. FIG. 16 illustrates a method in which a micro eNB sets all or part of subframes used in uplink transmission from the micro UE as a cell-specific SRS configuration based on an uplink subframe configuration in the case of a general CP (i.e., in the case in which one subframe includes 14 SC-FDMA symbols). FIG. 16 shows that uplink-transmission is blanked in a specific subframe index (for example, subframe #n) from among uplink subframes from the macro UE (MUE1) to the macro eNB (MeNB1). Blanking of uplink transmission may be applied to the entirety of a subframe (i.e., all 14 SC-FDMA symbols of a subframe). During an uplink subframe that is blanked from among uplink subframes from the MUE1, the micro eNB (HeNB1) may receive a PUSCH and/or PUCCH through an uplink subframe (for example, subframe #k) from the micro UE (HUE1). In this embodiment, since a boundary of an uplink subframe of the MUE1 is not aligned with a boundary of an uplink subframe of the HUE1, uplink transmission that starts in a subframe (for example, subframe #n+1) next to a subframe (for example, subframe #n) that is blanked for the MUE1 may partially collide (or overlap) with uplink transmission of the HUE1 (for example, SC-FDMA symbol #0 of subframe #n+1 of MUE1 may collide (or overlap) with SC-FDMA symbol

13 of subframe #k of HeNB1). Accordingly, to avoid interference occurring at the collision portion, according to the present invention, an uplink transmission subframe of the HUE1 may be set as a cell-specific SRS configuration such that a PUCCH or a PUSCH is not transmitted from the HUE1 in the collision portion (SC-FDMA symbol #13 of subframe #k).

This method may be satisfactorily applied when two times the propagation delay between the micro eNB and the macro eNB round trip time therebetween) is less than the temporal length of one SC-FDMA symbol. When such a method is performed, coordination may be performed in association with use of subframes so as to allow the macro eNB and the micro eNB to discriminate between subframes that can be freely used by the macro eNB and the micro eNB. For example, coordination may be performed so as to allow the macro eNB to use odd subframes and to allow the micro eNB to use even subframes. When such coordination associated with use of subframes has been performed, the micro eNB may set all or part of subframes, which can be freely used by the micro eNB, as a cell-specific SRS configuration. Information associated with a set of subframes that are set as a cell-specific SRS configuration may be exchanged in a coordination procedure of the macro eNB and the micro eNB.

Embodiment 4

This embodiment relates to a method in which transmission power of a micro eNB that has no channel for communication with a macro eNB is adjusted to solve the problem of interference with the Macro eNB.

In a heterogeneous network environment, it is difficult to perform interference avoidance through planned installation since the user installs a micro eNB (specifically, a femto cell eNB or a home eNB (HeNB)) without a cell planning procedure. It is also difficult to perform an operation for avoiding interference through direct instruction from a macro eNB since, generally, a micro eNB (specifically, a femto eNB) is not connected directly to the macro eNB and is not synchronized with the macro eNB. Accordingly, when a micro eNB having such properties is installed within the coverage of the macro eNB, a macro UE adjacent to the micro eNB may receive strong interference, causing a reduction in communication quality.

Figure 17:
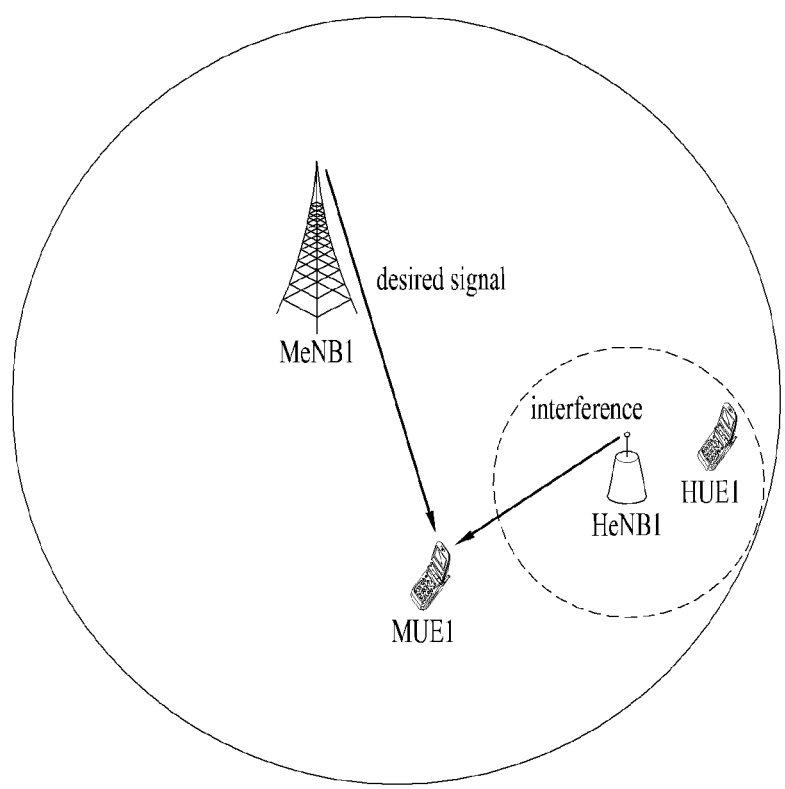
FIG. 17 illustrates the case in which a micro eNB causes interference to a macro UE.

FIG. 17 illustrates an example in which a micro eNB causes interference to a macro UE. As shown in FIG. 17, a macro UE (MUE1) receives strong interference from a micro eNB (HeNB1) such that the macro UE cannot correctly receive a signal from a macro eNB (MeNB1) which is a serving eNB of the MUE1.

This embodiment suggests a method in which a micro eNB receives a Pdwer Control Command (PCC) or an Interference Overload Indication (IOI) from a macro eNB and controls downlink transmission power of the micro eNB according to the PCC or IOI.

In the conventional 3GPP LTE system, an IOI has been defined as a signal notifying an adjacent cell that an uplink signal from a UE that is served by the adjacent cell causes high interference to uplink of a specific UE. The present invention suggests that this concept be applied also to downlink. That is, an IOI may be used as a signal indicating that a downlink signal from an adjacent cell causes high interference to downlink of a specific UE. In addition, the present invention suggests that a UL IOI and a DL IOI be separately defined to discriminate between downlink and uplink. That is, a UL IOI may be transmitted to an adjacent cell when a specific cell receives strong uplink interference from the adjacent cell and a DL IOI may be transmitted to the adjacent cell when the specific cell receives strong downlink interference from the adjacent cell.

Figure 18:
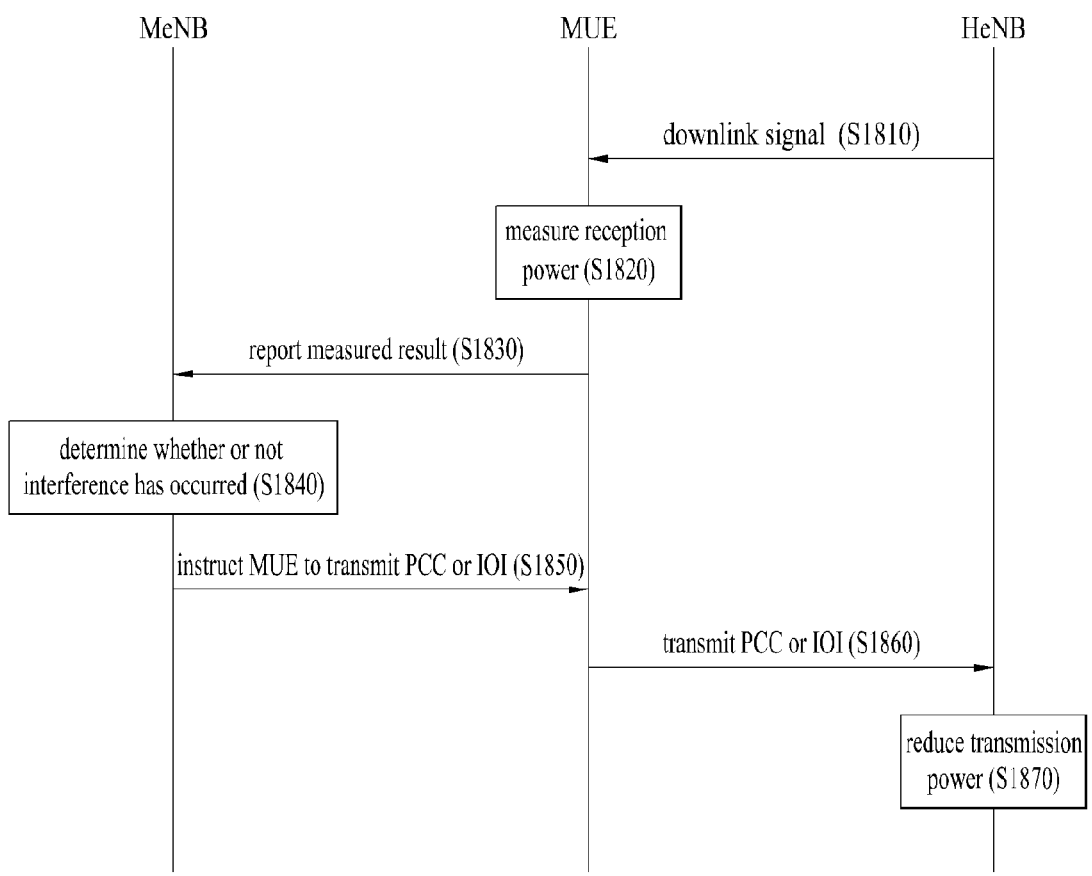
FIG. 18 illustrates a method for controlling transmission power according to an embodiment of the present invention.

FIG. 18 illustrates a method for controlling transmission power of a micro eNB according to an embodiment of the present invention. As shown in FIG. 18, each macro UE (MUE) may receive a downlink signal from an adjacent micro eNB (HeNB) (S1810), measure power of the received signal (S1820), and report the measured result to a serving macro eNB (MeNB) (S1830). Based on the reported reception power, the MeNB may determine whether or not transmission power of the specific micro eNB (HeNB) is excessively high, causing a problem in downlink signal quality of the MeNB (S1840). Upon determining that transmission power of the specific HeNB is excessively high causing high interference, the MeNB may instruct the MUE adjacent to the HeNB to transmit a PCC (or an IOI signal indicating that high interference has occurred) to the HeNB (S1850). Upon receiving this instruction, the MUE may transmit a signal (PCC) requesting the HeNB to reduce transmission power or a signal (101) indicating that transmission power of the HeNB is too high to the HeNB (S1810). Accordingly, the HeNB may reduce downlink transmission power of the HeNB (S1870).

In step S1860, it is difficult for the macro UE to use a channel for general data or a control signal to transmit the PCC or the IOI to the micro eNB since, generally, a micro eNB (specifically, femto cell) is not synchronized with a macro cell. In addition, if the micro eNB is a CSG eNB, the macro eNB may fail to transmit a PUCCH or a PUCCH to the micro eNB. Accordingly, the present invention suggests a method in which the macro UE transmits the PCC or the IOI to the micro eNB through a physical random access channel (PRACH). Since the PRACH is designed to be used in a state in which an eNB and a UE have not been completely synchronized, the PRACH is effective for use in transmission of a signal to an adjacent micro eNB which has not been synchronized with the macro UE.

A method of transmitting a PCC or an IOI using a PRACH is described below in more detail. First, a micro eNB can reserve some of PRACH preambles, which are to be used by the micro eNB, for PCC or IOI purposes. For example, when the micro eNB has a total of 64 PRACH preambles having PRACH preamble indices 0 to 63, the micro eNB may reserve a specific preamble (for example, preamble index 63) for PCC or IOI purposes. Here, it is also taken into consideration that the micro eNB has sufficient PRACH preamble resources since, generally, the micro eNB does not serve a large number of micro UEs. However, it is preferable that the PRACH preamble reserved for PCC or IOI purposes be limited to a PRACH preamble that is not used for initial access purposes since, if a UE (for example, a micro UE), which desires to connect to a micro eNB, attempts to make initial access to the micro eNB using the reserved PRACH preamble, confusion may occur in operation of the micro eNB.

If the micro eNB receives the reserved PRACH preamble (for example, preamble index 63) as described above, the micro eNB may determine that the received preamble is a PCC or IOI transmitted from the macro eNB through the macro UE and may perform an operation for reducing downlink transmission power of the micro eNB. For example, when the micro eNB has received a preamble which is reserved to be identified as a PCC, the micro eNB may perform an operation for reducing transmission power by a predetermined level (for example, by 1 [dB]).

Figure 19:
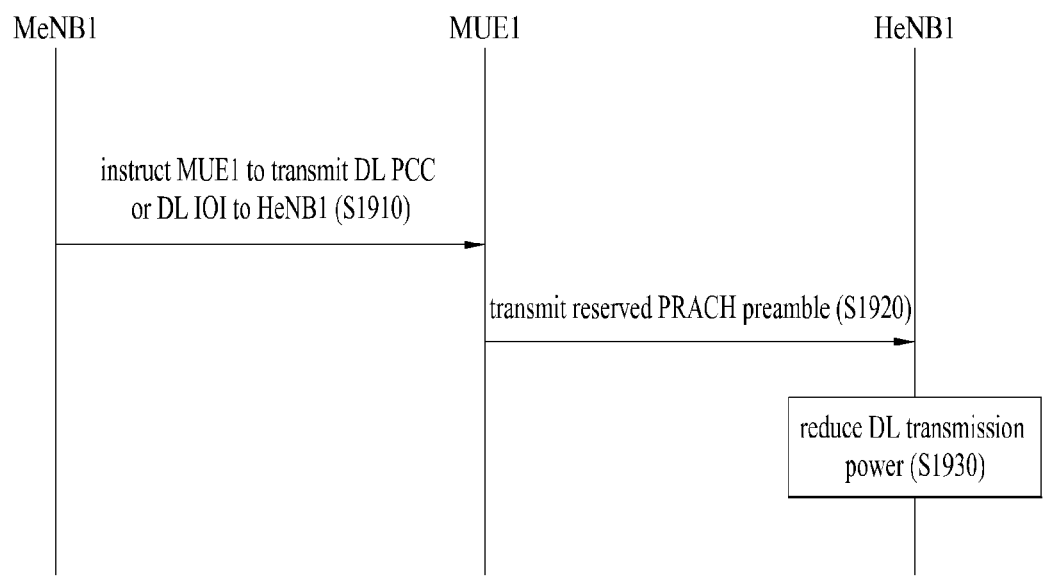
FIG. 19 illustrates a method for controlling transmission power according to another embodiment of the present invention.

FIG. 19 illustrates a method of controlling transmission power of a micro eNB in which a reserved PRACH preamble is used as a PCC or an IOI. Steps S1910 to S1930 of FIG. 19 may correspond to steps S1850 to S1870 of FIG. 18. As shown in FIG. 19, the MeNB1 may instruct the MUE1 to transmit a downlink PCC or a downlink IOI to the HeNB1 (S1910). Step S1910 may be performed when the MeNB1 has determined that the HeNB1 causes high interference based on downlink transmission power of the HeNB1 which has been measured by the MUE1 before step S1910. The MUE1 may transmit the reserved PRACH preamble (i.e., a PRACH preamble that is predetermined for DL PCC or DL IOI purposes) to the HeNB1 (S1920). Upon receiving the reserved PRACH preamble, the HeNB1 may identify the PRACH preamble as a DL PCC or a DL IOI and may perform an operation for reducing downlink transmission power of the HeNB1.

In order to allow the macro UE to effectively transmit a PRACH preamble to the micro eNB as described above, the serving macro eNB may transmit a signal indicating a PRACH configuration of the micro eNB to the macro UE. This signal may include information such as the position of PRACH resources of the micro eNB, a used preamble index, PRACH preamble transmission power, or the like. A procedure for transmitting the PRACH configuration information of the micro eNB and a procedure for transmitting a PRACH from the macro UE to the micro eNB may be performed in a manner similar to part of a conventional handover procedure.

To more effectively achieve transmission power control of the micro eNB, two or more specific PRACH preamble indices may be served for PCC or IOI purposes such that each reserved preamble index indicates the level by which transmission power is to be reduced or represents the intensity of interference that the macro UE is experiencing. For example, PRACH preamble indices 62 and 63 may be reserved for PCC purposes and may be set to allow the micro eNB to reduce transmission power by 1 [dB] when receiving the preamble index 62 and to allow the micro eNB to reduce transmission power by 2 [dB] when receiving the preamble index 63. Similarly, when specific PRACH preambles have been reserved for IOI purposes, the PRACH preambles may be set such that the preambles indicate different levels of intercell interference. For example, preamble indices 61, 62, and 63 may be set such that the preamble index 61 indicates low interference, the preamble index 62 indicates medium interference, and the preamble index 63 indicates high interference. Indicating the transmission power control level more specifically in this manner enables more efficient and accurate control of transmission power of the micro eNB.

In an embodiment of the present invention, the above method in which a PCC or an IOI is transmitted using transmission of a PRACH preamble from the macro UE may be extended such that more specific (or more detailed) PCC or IOI information is transmitted to the micro eNB in a random access procedure that is performed between the macro UE and the micro eNB after PRACH preamble transmission. This embodiment is described below in detail.

Figure 20:
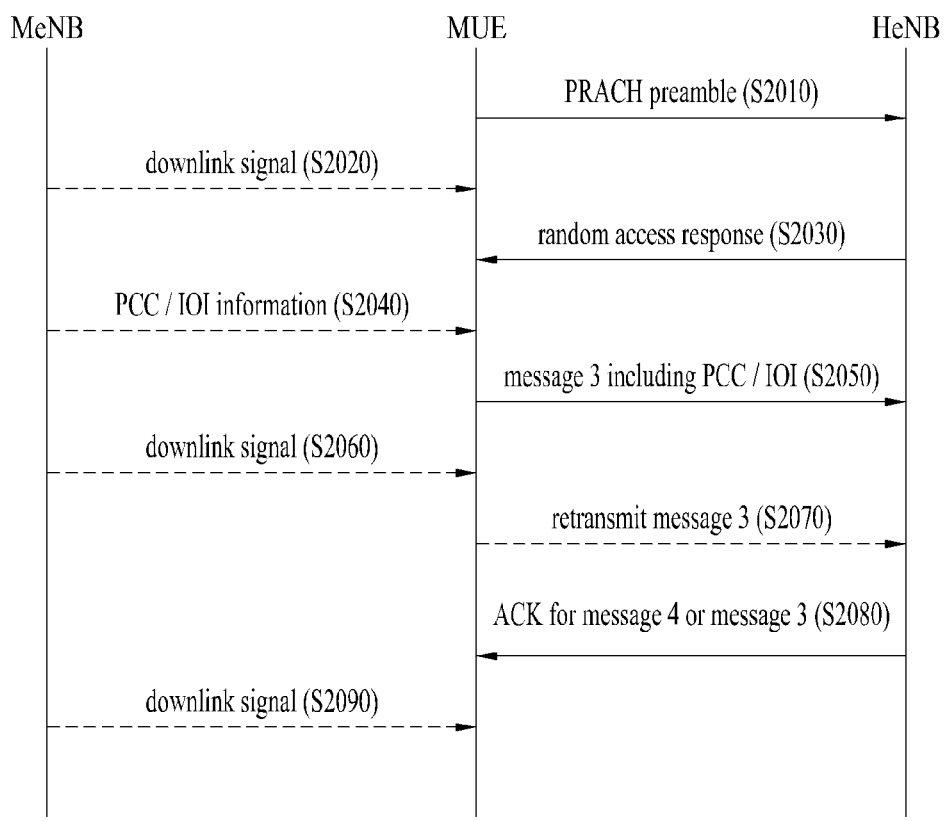
FIG. 20 illustrates a method for transmitting transmission power control information according to an embodiment of the present invention.

FIG. 20 illustrates such an embodiment of the present invention in which a macro UE transmits transmission power control, information to a micro eNB through a random access procedure.

First, the random access procedure is briefly described. The random access procedure may include, for example, the steps of a UE transmitting a random access preamble to an eNB (message 1 transmission), receiving a random access response message corresponding to the random access preamble from the eNB (message 2 reception), transmitting an uplink scheduled message including an identifier of the UE to the eNB using uplink scheduling information received in the random access response message (message 3 transmission), and receiving a contention resolution message corresponding to the uplink message from the eNB (message 4 reception).

As shown in FIG. 20, a macro UE (MUE) may transmit a PRACH preamble (i.e., message 1) to a micro eNB (HeNB) (S2010). After transmitting the message 1, the MUE may receive a signal from a macro eNB (MeNB) without receiving message 2 from the HeNB (i.e., without performing subsequent steps of the random access procedure for the HeNB) (S2020). In this case, transmission power control information (PCC or IOI) associated with the HeNB may be transmitted through a PRACH preamble as described above.

In another example, instead of transmitting PCC or IOI information to the HeNB through the PRACH preamble, the MUE may transmit PCC or IOI information to the HeNB through message 3 of the random access procedure. In this case, the MUE may receive a random access response message (message 2) from the HeNB (S2030) after transmitting the message 1 (S2010). The MUE may transmit the message 3 to the HeNB through uplink resources specified by the message 2 (S2050). Here, the message 3 may include specific (or detailed) PCC or IOI information. The specific PCC or IOI information may be, for example, individual PCC or IOI information of each subband. The information included in the message 3 may be provided from the MeNB to the MUE (S2040). The MUE, which has transmitted the message 3, may receive a signal of the macro eNB (MeNB) without receiving message 4 from the HeNB (i.e., without performing subsequent steps of the random access procedure for the HeNB) (S2060).

In another example, the MUE may transmit the message 1 (S2010), receive a random access response message (message 2) from the HeNB (S2030), and transmit message 3 including specific PCC or IOI information to the HeNB (S2050), and may then receive a HARQ ACK for the message 4 or message 3 from the HeNB (S2080). Accordingly, the MUE may receive a signal of the MeNB after confirming that transmission of the message 3 has been completely terminated (S2090). In the case in which the MUE has failed to receive the message 4 or has failed to receive an ACK for the message 3, the MUE may determine that the message 3 has not been completely transmitted and may attempt to retransmit the message 3 according to the random access procedure (S2070).

The method in which the MUE transmits transmission power control information (PCC or IOI) to the HeNB using the three schemes has been described above with reference to FIG. 20. That is, the first scheme may include steps S2010 and S2020 and the second scheme may include steps S2010 and steps S2030 to S2060. The third scheme may include steps S2010, steps S2030 to S2050, and steps S2070 to S2090.

When the MUE operates according to the second or third scheme, specific PCC or IOI information may be transmitted to the HeNB through message 3 instead of a PRACH preamble. Accordingly, in this case, it is possible that a PRACH preamble is not reserved for PCC or IOI information transmission.

Although the method has been described mainly in association with control of downlink transmission power of a micro eNB as an example, the principle of the present invention can be substantially equally applied to control of uplink transmission power of a micro eNB.

Figure 21:
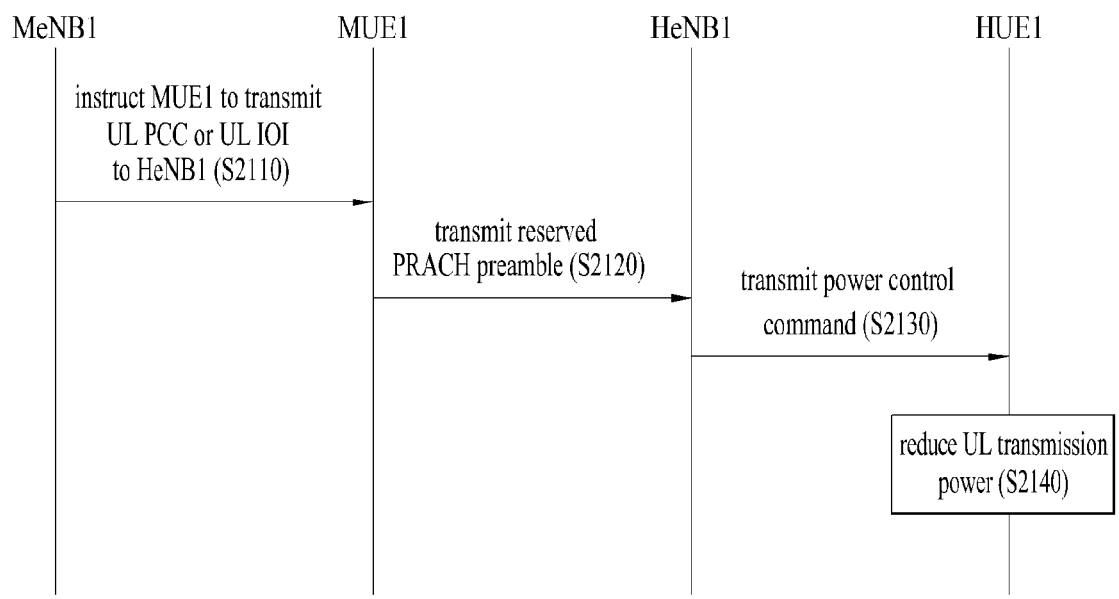
FIG. 21 illustrates a method for controlling uplink transmission power control information according to another embodiment of the present invention.

FIG. 21 illustrates a method of controlling uplink transmission power of a micro eNB according to an embodiment of the present invention.

As shown in FIG. 21, MeNB1 may instruct MUE1 to transmit an uplink PCC or an uplink IOI to HeNB1 (S2110). Step S2110 may be performed when the MeNB1 has determined that uplink transmission from the MUE1 to the MeNB1 is experiencing high interference due to uplink transmission from HUE1 to the HeNB1 based on power of uplink transmission from the HUE1 to the HeNB1 which has been measured by the MUE1 before step S2110. The MUE1 may transmit the reserved PRACH preamble (i.e., a PRACH preamble that is predetermined for UL PCC or UL IOI purposes) to the HeNB1 (S2120). Upon receiving the reserved PRACH preamble, the HeNB1 may identify the PRACH preamble as a UL PCC or a UL IOI and may transmit a Power Control Command (PCC) instructing the micro UE (HUE1) connected to the HeNB1 to reduce uplink transmission power of the HUE1 (S2140). Upon receiving the power control command, the HUE1 may perform an operation for reducing uplink transmission power of the HUE1 (S2140).

Instead of reserving a PRACH preamble for a UL PCC or a UL IOI, the MUE1 may perform a random access procedure for the HeNB1 and may transmit more specific UL PCC or UL IOI information using message 3 in the random access procedure. Upon receiving the specific UL PCC or UL IOI information through the message 3, the HeNB1 may transmit an uplink power control command to the HUE1 and, upon receiving the uplink power control command, the HUE1 may reduce uplink transmission power.

In addition, the present invention suggests a specific (or detailed) method for a micro eNB to control transmission power when the micro eNB receives power control information (PCC or IOI) according to the various methods described above.

When the micro eNB has received transmission power control information (PCC or IOI) is received through a reserved PRACH preamble or through message 3 in a random access procedure, the micro eNB may reduce transmission power of the micro eNB by the same level as indicated by the transmission power control information. In addition, the present invention suggests that a micro eNB be able to determine whether or not transmission power control information (PCC or IOI) is received through a reserved PRACH preamble or through message 3 in a random access procedure for a predetermined time (for example, while a timer set to a predetermined time runs) and increase transmission power of the micro eNB by a predetermined level upon determining that the transmission power control is not received for the predetermined time (i.e., when the timer has expired). The reason why the micro eNB increases transmission power in the case in which the transmission power control is not received for the predetermined time is because it can be assumed that a macro UE which receives interference from the micro eNB is not present around the micro eNB in such a case. Through such an operation, transmission power of the micro eNB can be adjusted to an appropriate level.

Figure 22:
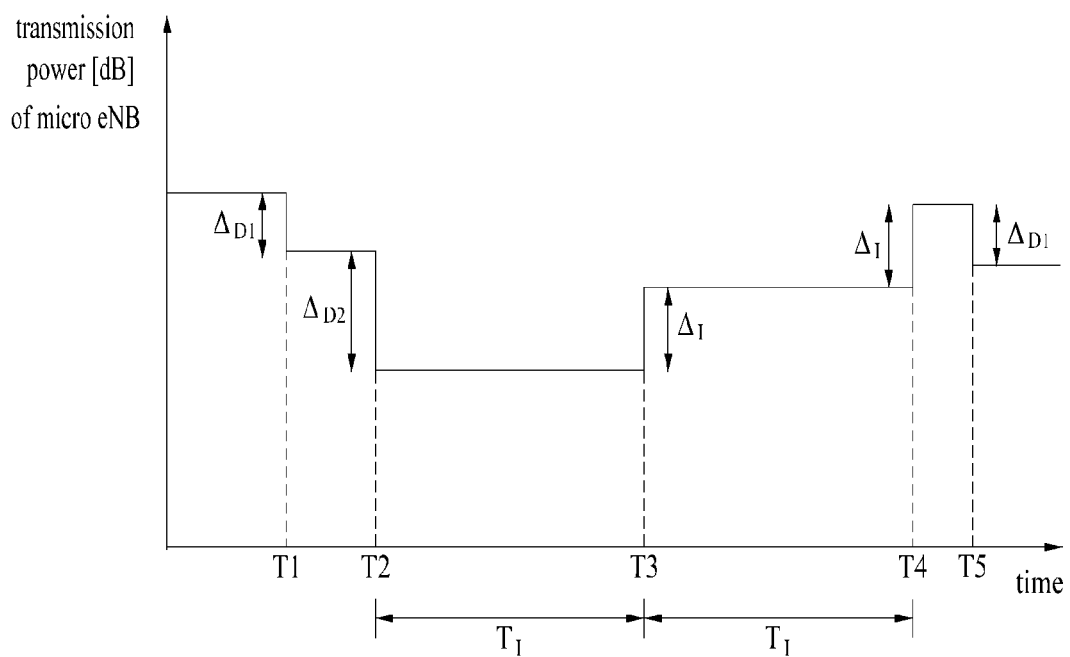
FIG. 22 illustrates a method for adjusting transmission power according to an embodiment of the present invention.

FIG. 22 illustrates an exemplary method for controlling transmission power of a micro eNB according to the present invention. In the example of FIG. 22, it is assumed that 2 PRACH preambles n1 and n2 have been reserved for a DL PCC and have been set to allow a micro eNB to reduce downlink transmission power by $\Delta_{D1}$[dB] when receiving the PRACH preamble n1 and to reduce downlink transmission power by $\Delta_{D2}$[dB] when receiving the PRACH preamble n2. In addition, the micro eNB may activate a timer having a temporal length of $T_I$ after increasing or reducing transmission power. When the PRACH preamble n1 or n2 is not received while the timer runs (i.e., before the timer expires), the micro eNB may increase downlink transmission power by $\Delta_{DI}$[dB]. Exemplary operations of the micro eNB are described in detail with reference to FIG. 22.

When the micro eNB receives the PRACH preamble n1 at time T1, the micro eNB reduces transmission power of the micro eNB by $\Delta_{D1}$[dB]. When the micro eNB receives the PRACH preamble n2 at time T2, the micro eNB reduces transmission power of the micro eNB by $\Delta_{D2}$[dB]. At time T3 when time $T_I$ has elapsed, after time T3, the micro eNB increases transmission power of the micro eNB by $\Delta_{DI}$[dB]. At time T4 when time $T_I$ has elapsed after time T4, the micro eNB increases transmission power of the micro eNB by $\Delta_{DI}$ [dB]. When the micro eNB receives the PRACH preamble n1 at time T5, the micro eNB reduces the transmission power by $\Delta_{D1}$[dB].

The operations for controlling transmission power of the micro eNB in association with FIG. 22 are merely exemplary. For example, when the micro eNB has received transmission power control information through message 3 in a random access procedure instead of a PRACH preamble, the micro eNB may also increase transmission power by a predetermined level when a predetermined time elapses after adjusting transmission power. In addition, although the example of FIG. 22 has been described mainly with reference to downlink transmission power of the micro eNB, the present invention is not limited to downlink transmission power of the micro eNB and the substantially same principle may be applied when the micro eNB adjusts uplink transmission power of micro UEs, which are being served by the micro eNB, based on transmission power control information from the macro UE.

The above description has been given of the method in which uplink and downlink transmission power control information (PCC or IOI) of a micro eNB is transmitted through a PRACH preamble or through a random access procedure. In addition, the present invention suggests that a macro eNB provide a signal, indicating that the macro eNB will allocate high transmission power to an entire bandwidth or a specific subband, to a micro eNB in a manner similar to the methods of the above embodiments of the present invention. The signal indicating that the macro eNB will allocate high transmission power to a specific frequency band may be a Relative Narrowband Transmission Power (RNTP) in the case of downlink or may be a High Interference Indication (HII) in the case of uplink as defined in the 3GPP LTE system. When the micro eNB has received the signal (RNTP or HII) from the macro eNB, the micro eNB may take into consideration the signal (RNTP or HII) when setting scheduling and uplink transmission power of micro UEs connected to the micro eNB.

The micro eNB may also transmit a DL/UL PCC, a DL/UL IOI, an RNTP, or an HII to the macro eNB through a random access procedure or PRACH preamble transmission that a micro UE performs for the macro eNB, similar to the various methods described in the present invention. Upon receiving these signals, the macro eNB may perform an operation for controlling uplink or downlink transmission power of the macro eNB, similar to the operation of the micro eNB described above.

Figure 23:
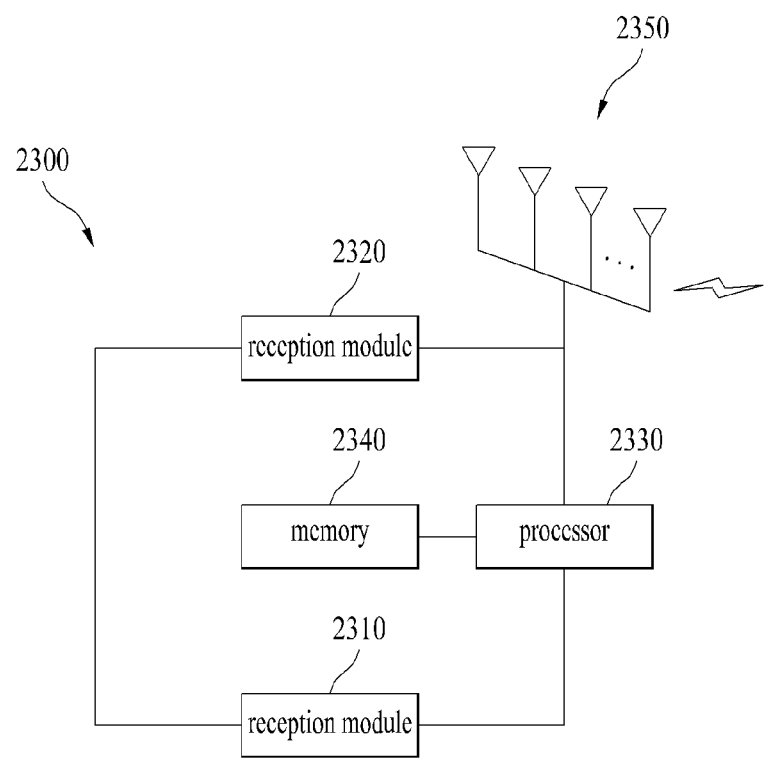
FIG. 23 illustrates the configuration of a preferred embodiment of an eNB or UE apparatus according to the present invention.

FIG. 23 illustrates a configuration of a preferred embodiment of an eNB apparatus or a UE apparatus according to the present invention. Although the same reference numerals are used for the UE apparatus and the eNB apparatus, this does not mean that the UE and eNB apparatuses have the same configuration. That is, the following description is given of individual configurations of the UE apparatus and the eNB apparatus.

As shown in FIG. 23, an eNB apparatus 2300 according to the present invention may include a reception module 2310, a transmission module 2320, a processor 2330, a memory 2340, and a plurality of antennas 2350. Inclusion of the plurality of antennas 2350 indicates that the eNB apparatus supports MIMO transmission and reception. The reception module 2310 may receive various uplink signals, data, and information from UEs. The transmission module 2320 may transmit various downlink signals, data, and information UEs. The processor 2330 may control overall operation of the eNB apparatus 2300.

The processor 2330 of an eNB apparatus for reducing intercell interference in a wireless communication system according to an embodiment of the present invention may operate so as to align a boundary of a downlink subframe transmitted to a first UE that is being served by the eNB with a boundary of a downlink subframe that a second UE receives from a different eNB. In addition, the processor 2330 may be configured to acquire timing advance information indicating a time by which a boundary of an uplink subframe from the first UE to the eNB advances compared to the aligned downlink subframe boundary and to notify the first UE of a time point (timing) at which the first UE transmits an uplink subframe to the eNB based on the acquired timing advance information. Accordingly, a boundary of an uplink subframe transmitted from the first UE, which has been notified of the time point, to the first eNB may be aligned with a boundary of an uplink subframe transmitted from the second UE to the different eNB.

The processor 2330 of an eNB apparatus for adjusting transmission power for reducing interference in a wireless communication system according to another embodiment of the present invention may be configured to receive transmission power control information, indicating that downlink transmission power from the eNB to the first UE or uplink transmission power from the first UE to the eNB is to be reduced, from the second UE and to reduce the downlink transmission power or the uplink transmission power based on the received transmission power control information. Here, the downlink transmission power or the uplink transmission power may be measured by the second UE, the transmission power measured by the second UE may be reported to a second eNB, and the transmission power control information may be provided from the second eNB to the second UE.

Referring to FIG. 23, the UE apparatus 2300 according to the present invention may include a reception module 2310, a transmission module 2320, a processor 2330, a memory 2340, and a plurality of antennas 2350. Inclusion of the plurality of antennas 2350 indicates that the UE apparatus supports MIMO transmission and reception. The reception module 2310 may receive various downlink signals, data, and information from an eNB. The transmission module 2320 may transmit various uplink signals, data, and information to an eNB. The processor 2330 may control overall operation of the UE apparatus 2300.

The processor 2330 of a UE that supports transmission power control for reducing interference in a wireless communication system according to another embodiment of the present invention may be configured to measure downlink transmission power from a second eNB to a different UE or uplink transmission power from the different UE to the second eNB. The processor 2330 may also be configured to report the measured transmission power to the first eNB, to receive transmission power control information, indicating that the downlink transmission power or the uplink transmission power is to be reduced, from the first UE, and to transmit the received transmission power control information to the second eNB. The downlink transmission power or the uplink transmission power may be reduced by the second eNB based on the transmission power control information.

The processor of the eNB apparatus or the UE apparatus may further have a function to arithmetically process information received by the eNB apparatus or the UE apparatus, information to be externally transmitted, and the like and the memory 2340 may store such arithmetically processed information or the like for a certain time and may be replaced with a component such as a buffer (not shown).

Detailed configurations of the eNB apparatus or the UE apparatus may be implemented such that details of the various embodiments of the present invention described above are equally applied.

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. For example, software code can be stored in a memory unit so as to be executed by a processor. The memory unit may be located inside or outside the processor and can communicate data with the processor through a variety of known means.

The detailed description of the exemplary embodiments of the present invention has been given to enable those skilled in the art to implement and practice the present invention. Although the present invention has been described with reference to the exemplary embodiments, those skilled in the art will appreciate that various modifications and variations can be made in the present invention without departing from the spirit or scope of the present invention described in the appended claims. For example, those skilled in the art may combine the structures described in the above embodiments in a variety of ways. Accordingly, the present invention should not be limited to the specific embodiments described herein, but should be accorded the broadest scope consistent with the principles and novel features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. The invention should not be limited to the specific embodiments described herein, but should be accorded the broadest scope consistent with the principles and novel features disclosed herein. In addition, claims which are not explicitly dependent on each other can be combined to provide an embodiment or new claims can be added through amendment after this application is filed.

INDUSTRIAL APPLICABILITY

The embodiments of the present invention are applicable to various mobile communication systems.

The invention claimed is:

1. A method for reducing intercell interference in a heterogeneous network, wherein the heterogeneous network includes a first base station, which is a Home eNB (HeNB), and a second base station, which is a Macro eNB (MeNB), the first and second base stations being present together in an overlay manner, the method performed by the first base station and comprising:
adjusting a boundary of a downlink subframe transmitted from the first base station to a first user equipment to be matched with a boundary of a downlink subframe received from the second base station to a second user equipment, based on time difference information received between boundaries of downlink subframes from the second user equipment, by a random access procedure from the second user equipment to the first base station,
wherein the first user equipment is a Home User Equipment (HUE) served by the first base station and the second user equipment is a Macro User Equipment (MUE) served by the second base station and is located adjacent to the first base station;
acquiring timing advance information indicating a time by which a boundary of an uplink subframe from the first user equipment to the first base station advances compared to the adjusted boundary of the downlink subframe; and
notifying the first user equipment of a time point at which an uplink subframe is transmitted from the first user equipment to the first base station based on the acquired timing advance information,
wherein the boundary of the uplink subframe transmitted from the notified first user equipment to the first base station and a boundary of an uplink subframe transmitted from the second user equipment to the second base station are matched with each other.

2. The method according to claim 1, wherein the adjusting the boundary of the downlink subframe includes adjusting the boundary of the downlink subframe transmitted from the first base station to the first user equipment to be matched with a boundary of a downlink subframe acquired by receiving a downlink signal from the second base station.

3. The method according to claim 1, wherein the adjusting the boundary of the downlink subframe includes:
adjusting a start time of the boundary of the downlink subframe from the first base station to the first user equipment based on the time difference information,
wherein the time difference information between the boundaries of the downlink subframes is calculated as a time difference between the boundary of the downlink subframe from the first base station and the boundary of the downlink subframe from the second base station by the second user equipment by receiving both a downlink signal from the first base station and a downlink signal from the second base station.

4. The method according to claim 1, wherein acquiring the timing advance information is performed by:
receiving, from the first user equipment, timing advance information acquired by the first user equipment by performing a random access procedure for the second base station,
receiving, from the second user equipment or the second base station, timing advance information of uplink transmission from the second user equipment to the second base station, or
detecting an uplink signal from the second user equipment to the second base station and estimating timing advance information of uplink transmission from the second user equipment to the second base station.

5. The method according to claim 4, wherein the receiving the timing advance information of uplink transmission from the second user equipment to the second base station from the second user equipment is performed by a random access procedure from the second user equipment to the first base station.

6. The method according to claim 4, wherein the receiving, from the second base station, the timing advance information of uplink transmission from the second user equipment to the second base station is performed through a control channel from the second base station to the first base station.

7. The method according to claim 1, wherein the notifying the first user equipment is performed through a common timing advance command for one or more user equipments served by the first base station.

8. The method according to claim 1, wherein the first base station adjusts the boundary of the uplink subframe from the first user equipment to the first base station to be matched with the boundary of the downlink subframe from the first base station to the first user equipment when the second user equipment is not located adjacent to the first base station.

9. The method according to claim 8, wherein all or part of subframes to which uplink transmission from the first user equipment to the first base station is allocated are set as cell-specific sounding reference signal transmission subframes.

10. A first base station for reducing intercell interference in a heterogeneous network, wherein the heterogeneous network includes the first base station, which is a Home eNB (HeNB), and a second base station, which is a Macro eNB (MeNB), the first and second base stations being present together in an overlay manner, the first base station comprising:
a reception module configured to receive an uplink signal from a first user equipment;
a transmission module configured to transmit a downlink signal to the first user equipment; and
a processor configured to:
control the first base station including the reception module and the transmission module,
adjust a boundary of a downlink subframe transmitted from the first base station to the first user equipment to be matched with a boundary of a downlink subframe received from the second base station to a second user equipment, based on time difference information received between boundaries of downlink subframes from the second user equipment, by a random access procedure from the second user equipment to the first base station,
wherein the first user equipment is a Home User Equipment (HUE) served by the first base station and the second user equipment is a Macro User Equipment (MUE) served by the second base station and is located adjacent to the first base station,
acquire timing advance information indicating a time by which a boundary of an uplink subframe from the first user equipment to the first base station advances compared to the aligned boundary of the downlink subframe, and
notify the first user equipment of a time point at which an uplink subframe is transmitted from the first user equipment to the first base station based on the acquired timing advance information, and
wherein the boundary of the uplink subframe transmitted from the notified first user equipment to the first base station and a boundary of an uplink subframe transmitted from the second user equipment to the second base station are matched with each other.

* * * * *